United States Patent
Lin et al.

(10) Patent No.: US 9,577,543 B2
(45) Date of Patent: Feb. 21, 2017

(54) CONSTANT ON TIME (COT) CONTROL IN ISOLATED CONVERTER

(71) Applicant: Alpha and Omega Semiconductor (Cayman) Ltd., Sunnyvale, CA (US)

(72) Inventors: Tien-Chi Lin, New Taipei (TW); Chih-Yuan Liu, Zhubei (TW); Yueh-Ping Yu, Zhubei (TW); Pei-Lun Huang, Zhubei (TW)

(73) Assignee: Alpha & Omega Semiconductor (Cayman), Ltd., Sunnyvale, CA (US)

( * ) Notice: Subject to any disclaimer, the term of this patent is extended or adjusted under 35 U.S.C. 154(b) by 242 days.

(21) Appl. No.: 14/562,735

(22) Filed: Dec. 7, 2014

(65) Prior Publication Data

US 2016/0079878 A1 Mar. 17, 2016

(30) Foreign Application Priority Data

Sep. 12, 2014 (TW) .............................. 103131584 A

(51) Int. Cl.
*H02M 3/335* (2006.01)

(52) U.S. Cl.
CPC ..... *H02M 3/33592* (2013.01); *H02M 3/33507* (2013.01)

(58) Field of Classification Search
CPC .............. H02M 3/33569; H02M 3/335; H02M 3/33507; H02M 3/33538; H02M 3/33523; H02M 3/33515; H02M 3/33592; H02M 3/33576; H02M 3/33561; H02M 3/1563; H02M 3/3385; H02M 3/156; H02M 3/157; H02M 3/1584; H02M 1/32; H02M 1/4258; H02M 1/36; H02M 1/4208; H02M 1/4225; H02M 1/4233; H02M 7/517; H02M 7/493; H02M 7/53871; H02M 7/7575; H02M 7/525; H02M 7/219; H02M 7/12; H02M 7/217; H02M 7/06; H02M 7/068; H02M 7/10; H02M 5/4585; H02M 2001/0032; H02M 2001/0006
(Continued)

(56) References Cited

U.S. PATENT DOCUMENTS 5,991,172 A 11/1999 Jovanovic et al.
6,385,059 B1 5/2002 Telefus et al.
(Continued)

FOREIGN PATENT DOCUMENTS

EP 2256912 A1 1/2010
EP 2173025 A1 7/2010
(Continued)

OTHER PUBLICATIONS

Office Action date Dec. 31, 2015 of U.S. Appl. No. 14/562,727.
(Continued)

*Primary Examiner* — Matthew Nguyen
*Assistant Examiner* — Kevin H Sprenger
(74) *Attorney, Agent, or Firm* — Lance A. Li; Chein-Hwa Tsao; 5Suns

(57) ABSTRACT

The present invention discloses a constant on-time isolated converter comprising a transformer with a primary side and a secondary side. The primary side is connected to an electronic switch and secondary-side is connected to a load and a processor. The processor is connected to a driver on primary side through at least one coupling element and to the electronic switch. The processor receives an output voltage or an output current across the load generating a control signal accordingly. The driver receives the control signal through the coupling element and accordingly changes the ON/OFF state of the electronic switch, regulating the output voltage and the output current via the transformer, where the (Continued)

duration of the ON/OFF state of the electronic switch is determined between the moment control signal changes from negative to positive and the moment it changes from positive to negative to achieve a high-speed load transient response.

19 Claims, 24 Drawing Sheets

(58) Field of Classification Search
USPC .............. 363/20, 21.12–21.15, 21.17–21.18, 49,363/78–81, 84, 89, 125–127
See application file for complete search history.

(56) References Cited

U.S. PATENT DOCUMENTS

| | | | |
|---|---|---|---|
| 7,701,730 | B2 | 4/2010 | Dhuyvetter et al. |
| 7,746,673 | B2 | 6/2010 | Grant et al. |
| 7,821,797 | B2 | 10/2010 | Nishiyama et al. |
| 8,405,367 | B2 | 3/2013 | Chisenga et al. |
| 8,427,853 | B2 | 4/2013 | Uno |
| 8,493,047 | B2 | 7/2013 | Zhang et al. |
| 8,531,166 | B2 | 9/2013 | Fang et al. |
| 8,582,326 | B2 | 11/2013 | Hosotani et al. |
| 8,630,105 | B2 | 1/2014 | Uno |
| 2002/0080634 | A1 | 6/2002 | Nozawa et al. |
| 2003/0142529 | A1* | 7/2003 | York ................ H02M 5/271 365/65 |
| 2006/0083032 | A1 | 4/2006 | McDonald et al. |
| 2006/0279969 | A1* | 12/2006 | Leung ............... H02M 3/33515 363/41 |
| 2008/0130325 | A1 | 6/2008 | Ye |
| 2009/0027012 | A1 | 1/2009 | Umetsu et al. |
| 2009/0028273 | A1 | 1/2009 | Lin et al. |
| 2010/0165666 | A1 | 7/2010 | Wang et al. |
| 2010/0165667 | A1* | 7/2010 | Artusi .............. H02M 1/4225 363/21.01 |
| 2011/0222318 | A1 | 9/2011 | Uno et al. |
| 2011/0228571 | A1 | 9/2011 | Lin et al. |
| 2011/0242858 | A1 | 10/2011 | Strzalkowski |
| 2012/0033454 | A1 | 2/2012 | Hosotani et al. |
| 2012/0043951 | A1 | 2/2012 | Kuo et al. |
| 2012/0153866 | A1 | 6/2012 | Liu |
| 2013/0134892 | A1 | 5/2013 | Kado et al. |
| 2013/0235620 | A1 | 9/2013 | Morris et al. |
| 2014/0028211 | A1 | 1/2014 | Inam et al. |
| 2014/0246988 | A1 | 9/2014 | Chen |

FOREIGN PATENT DOCUMENTS

| | | |
|---|---|---|
| RU | 2264685 C1 | 11/2005 |
| RU | 2457601 C1 | 7/2012 |
| TW | 200633596 A | 9/2006 |
| TW | 512580 | 12/2012 |
| WO | 2011/051824 A1 | 5/2011 |
| WO | 2012/109783 A1 | 8/2012 |
| WO | 2013/130836 A2 | 9/2013 |

OTHER PUBLICATIONS

Office Action date Nov. 4, 2015 of U.S. Appl. No. 14/562,731.
Office Action date Dec. 17, 2015 of U.S. Appl. No. 14/562,733.
Int'l. Search Report and Written Opinion; PCT Application No. PCT/US2015/050526; RU Searching Authority; dated Jan. 14, 2016.
Int'l. Search Report and Written Opinion; PCT Application No. PCT/US2015/050528; RU Searching Authority; dated Jan. 14, 2016.
Int'l. Search Report and Written Opinion; PCT Application No. PCT/US2015/050529; RU Searching Authority; dated Jan. 14, 2016.
Int'l. Search Report and Written Opinion; PCT Application No. PCT/US2015/050536; RU Searching Authority; dated Jan. 14, 2016.
Taiwan Office Examination Report No. 10520148440, issued in related Taiwan Application No. 103131584, mailed Feb. 3, 2016.
Taiwan Office Examination Report No. 10520539200, issued in related Taiwan Application No. 103131586, mailed May 2, 2016.
Taiwan Office Examination Report No. 10520539320, issued in related Taiwan Application No. 103131589, mailed May 2, 2016.

* cited by examiner

US 9,577,543 B2

CONSTANT ON TIME (COT) CONTROL IN ISOLATED CONVERTER

PRIORITY CLAIM

This application claims the priority benefit of Taiwanese patent application number 103131584 filed Sep. 12, 2014 by a common inventor of this Application. The entire Disclosure made in the Taiwanese patent application number 103131584 is hereby incorporated by reference.

FIELD OF PRESENT INVENTION

The present invention relates to an isolated converter, and more particularly relates to an isolated converter implementing constant on-time control to regulate output voltage.

BACKGROUND OF RELATED ART

With recent advances in technology, electronic products have been developed to meet the diverse needs in everyday life. As these products are made of various electronic components with different power supply and voltage requirements, the AC power supply from wall needs to be converted to appropriate voltages for each of the electronic components to ensure proper operation.

Conventional AC/DC Converters implement an isolated voltage divider design. After coupling the AC power with rectifiers, a transformer is used to convert the high voltage AC power to low voltage DC power that can be used by the devices. As shown in FIG. 1, the conventional power converter includes a transformer 10, which includes a primary side connected to an electronic switch 12 and a secondary side connected to a load 14, an output capacitor 15 and a voltage divider 16 connected to a processor 18. Through a photo-coupler 20, the processor 18 is connected to a controller 22 that is connected to electronic switch 12 to control its switching state. When a voltage is applied across load 14, the voltage divider 16 retrieves a feedback voltage from the load and sends it to the processor 18 that generates an analog signal accordingly and then transmits it from the secondary side through the photo-coupler 20 to the controller 22 in the primary side. Controller 22 changes the ON/OFF state of electronic switch 12 according to this analog signal. Since the processor 18 comprises of TL431 (three-terminal programmable shunt regulator) and VM (voltage-mode) compensation circuit, it uses zero/pole compensation to compensate the loop gain and bandwidth to reduce the ripple signal of the load voltage, stabilizing the whole system. However, the controller 22 is located on the primary side and thus cannot detect the load voltage directly. There is also delay in TL431 and the VM compensation circuit transmitting the signal generated from the feedback voltage of the load to the controller 22, resulting in the load voltage not being stabilized quickly. Furthermore, it is difficult to be controlled in a continuous current mode (CCM) when having a synchronous rectifier in the secondary side.

It is within this context that embodiments of the present invention arise.

BRIEF DESCRIPTION OF THE DRAWINGS

The embodiments of this invention are described in more detail with reference to the accompanying drawings. However, the accompanying drawings are for the purpose of descriptions and illustrations only and do not impose limitation to the scope of the present invention.

DESCRIPTION OF THE SPECIFIC EMBODIMENTS

Figure 1:
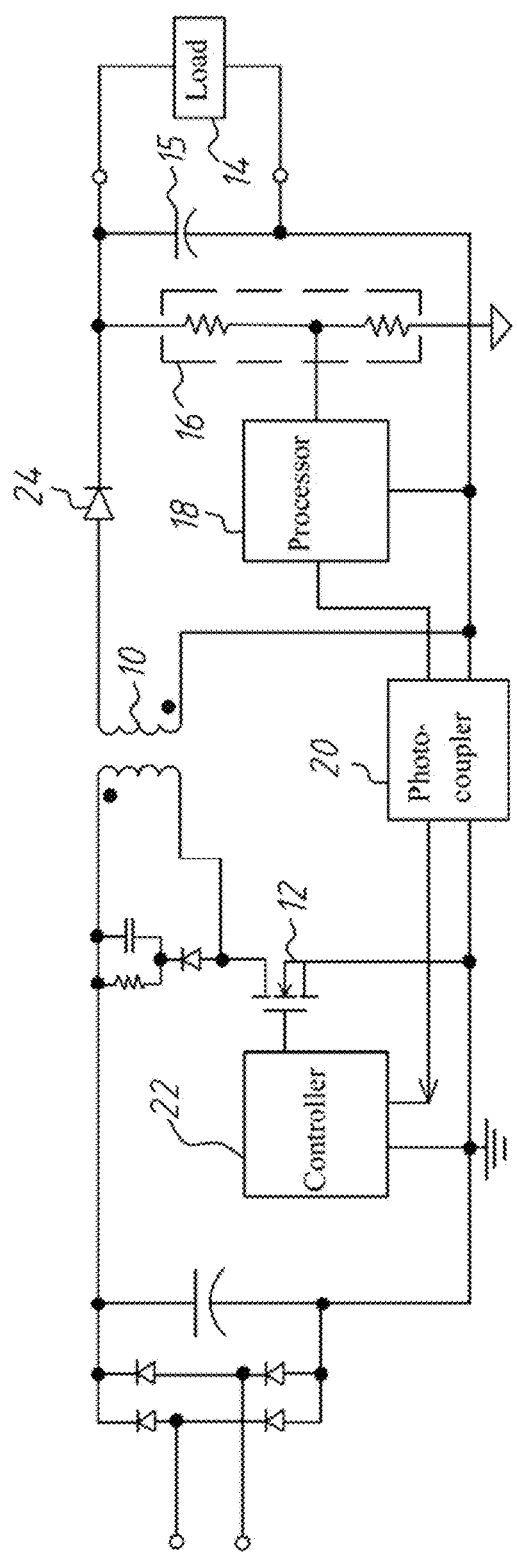
FIG. 1 is a circuit diagram of a conventional isolated converter.
Figure 2:
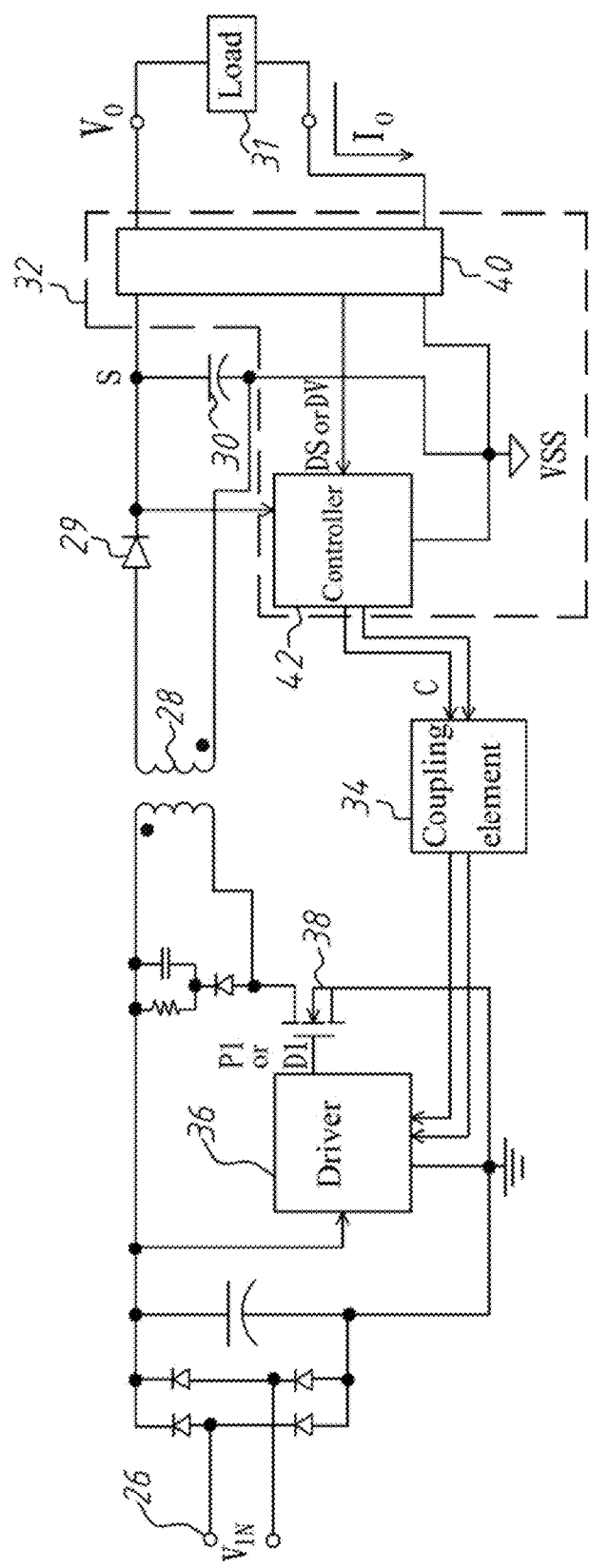
FIG. 2 is a circuit diagram of an isolated converter according to a first embodiment of the present invention.

FIG. 2 is a circuit diagram of an isolated converter according to a first embodiment of the present invention. The constant on-time (COT) isolated converter is connected to an input terminal 26 to receive an input voltage $V_{IN}$. The converter comprises a transformer 28 connected to the input terminal 26 at its primary side and to an output capacitor 30 and a load 31 through a diode 29 at its secondary side. The anode of diode 29 is connected to the secondary side of the transformer 28 while the cathode is connected to the output capacitor 30 and load 31. The secondary side of the transformer 28 and the load 31 are connected to a processor 32, which receives a start-up voltage S and an output voltage Vo or an output current Io across load 31 and thus generates a control signal C. The transmission medium between the primary side and the secondary side of the transformer 28 may be electric, magnetic, piezoelectric element or light. Hence the processor 32 is connected to at least one coupling element 34, such as a capacitor, a transformer, a piezoelectric element or an optical coupling element, to transmit the control signal C to the primary side. The primary side of the transformer 28 and the coupling element 34 are connected to a driver 36 connected to the input terminal 26. Driver 36 receives the control signal C through the coupling element 34 and amplifies it to generate a first digital signal D1. Driver 36 also includes a circuit protection function. The primary side of the transformer 28 and driver 36 are connected to an electronic switch 38, such as N-channel MOSFETs or bipolar junction transistor, which receives the first digital signal D1 and accordingly changes its ON/OFF state to control the output voltage $V_O$ and output current $I_O$ generated via transformer 28 from the input voltage $V_{IN}$ through the diode 29. The duration, in which the electronic switch remains in an ON/OFF state, is determined by the time taken for the control signal C to change from negative to positive and then from positive to negative, for example, as the control signal C is a pulse signal, when it changes from negative to positive, the first electronic switch 38 is turned on and remains on until the signal drops and changes from positive to negative, hence the ON state is ended. The switch is turned off and remains off until the signal changes from negative to positive, thus it is turned on again. Driver 36 also receives an input voltage $V_{IN}$ from the input terminal 26 and generates a first pulse signal P1 to the electronic switch 38 changing the ON/OFF state of the switch to control the output voltage $V_O$ and output current $I_O$ across load 31 via transformer 28, which further provides the start-up voltage S to the processor 32 to generate the control signal C. When driver 36 receives the control signal C through the coupling element 34, it stops generating the first pulse signal P1.

Figure 3A:
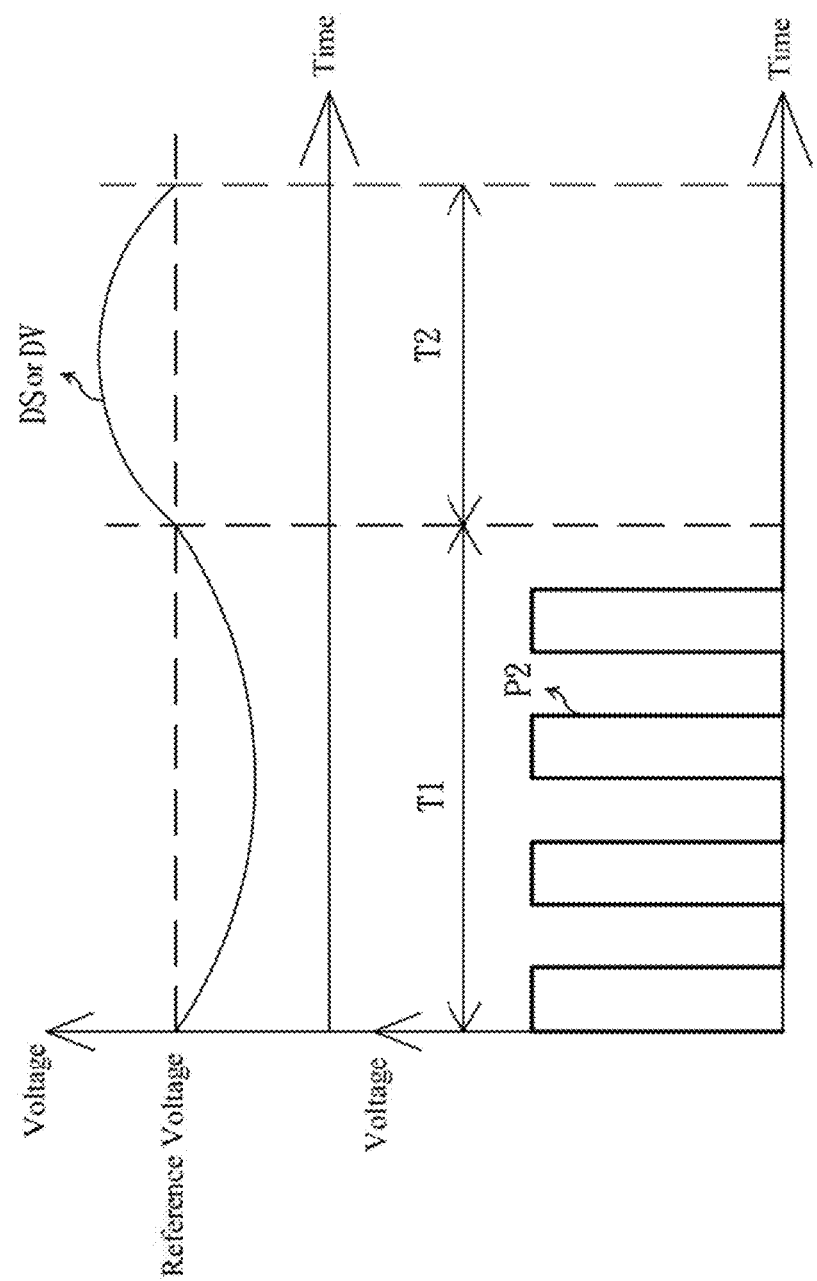
FIG. 3A shows the waveform of the feedback voltage DV or the detection voltage DS and the control signal.

Processor 32 comprises a signal extractor 40 and a controller 42. The electrical signal extractor 40 is connected to the low potential VSS, the secondary side of the transformer 28 and the load 31, thus capturing a feedback voltage DV or a detection voltage DS corresponding to the output current $I_O$. The controller 42 is connected to the coupling element 34, the secondary side of the transformer 28 and the signal extractor 40. The controller 42 receives the start-up voltage S and the feedback voltage DV or detection voltage DS from the signal extractor 40 and thus generates the control signal C. Referring to FIG. 2 and FIG. 3A, the controller 42 is provided with a preset reference voltage, hence when the feedback voltage DV is less than the reference voltage, the control signal C is a second pulse signal P2 with at least one cycle, i.e., the waveform of plural cycles appearing within time period T1 as shown in FIG. 3A. The second pulse signal P2 in each of the first half cycle is at a high voltage level and in each of the second half cycle is at a low voltage level. When the feedback voltage DV is greater than the reference voltage, i.e., within time period T2, the control signal C is at the low voltage level. Similarly, when the detection voltage DS is less than the reference voltage, the control signal C is the second pulse signal P2 of at least one cycle. The second pulse signal P2 in each of the first half cycle is at the high voltage level and in each of the second half cycle is at the low voltage level. When the detection voltage DS is greater than the reference voltage, i.e., within time period T2, the control signal C is at the low voltage level.

Figure 3B:
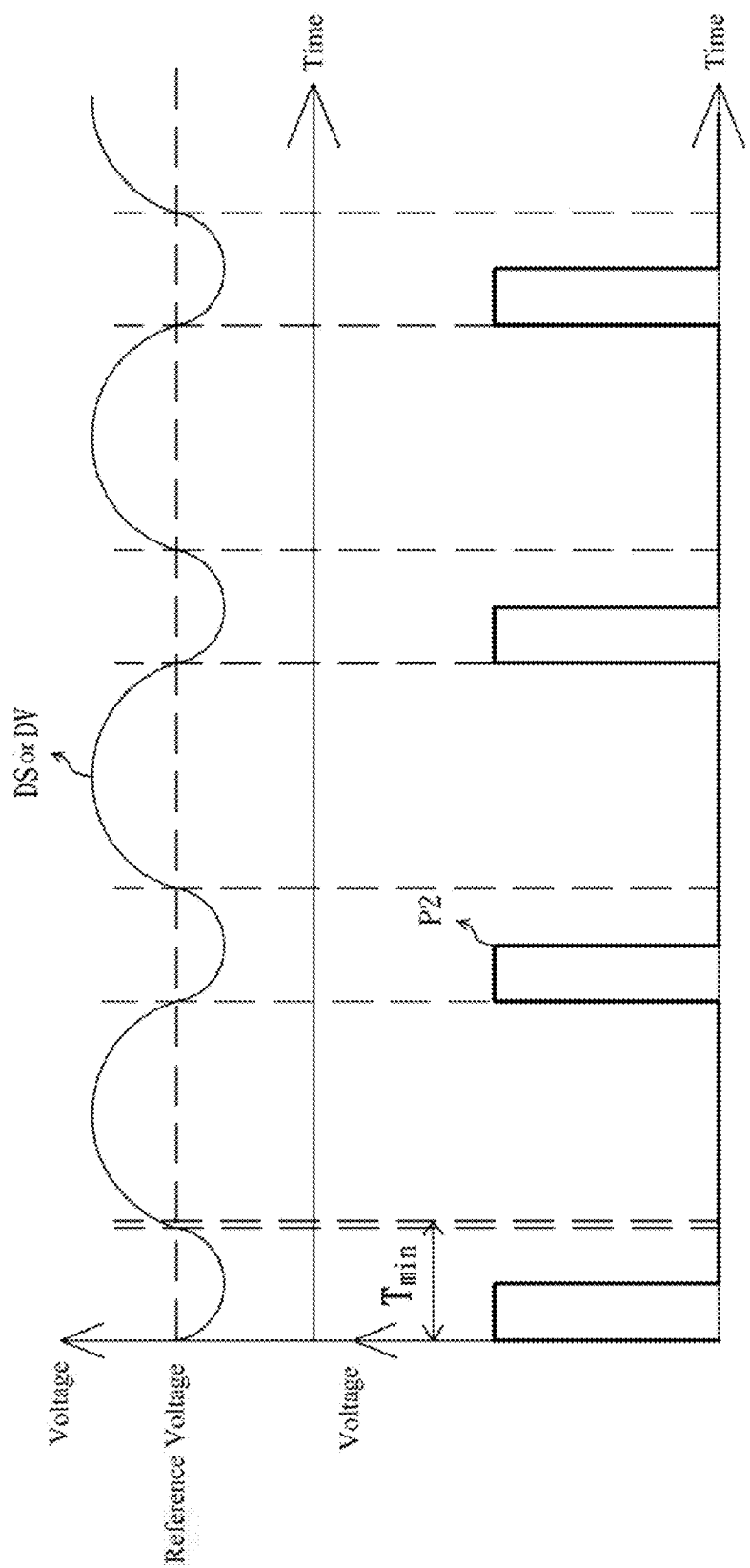
FIG. 3B shows the waveform of the feedback voltage DV or the detection voltage DS and another control signal.

As shown in FIG. 3B, the moment when the feedback voltage DV is less than the reference voltage, the control signal C sends out a single cycle second pulse signal P2 such as the waveform within a preset period $T_{min}$ of the controller 42. The second pulse signal P2 in the first half cycle is at the high voltage level and in the second half cycle is at the low voltage level, wherein a duration of the high voltage level is determined by the controller 42 in the secondary side. Within the preset period $T_{min}$ when the feedback voltage DV is greater than the reference voltage, the control signal C will not send out the next second pulse signal P2 until the feedback voltage DV is less than the reference voltage. Similarly, when the detection voltage DS is less than the reference voltage, the control signal C sends out the single cycle second pulse signal P2 within the preset period $T_{min}$ of controller 42. The second pulse signal P2 in the first half cycle is at a high voltage level and in the second half cycle is at a low voltage level, wherein the duration of the high voltage level is determined by the controller 42 in the secondary side. Within the preset period $T_{min}$ when the detection voltage DS is greater than the reference voltage, the control signal C will not send out the next second pulse signal P2 until the detection voltage DS is less than the reference.

The start-up mode of operation of the first embodiment is described as follows. First, driver 36 receives an input voltage $V_{IN}$ from the input terminal 26 generating a first pulse signal P1 transmitted to the electronic switch 38, which changes its ON/OFF state accordingly in order to control the output voltage $V_O$ and output current $I_O$ across load 31. The output voltage $V_O$ and output current $I_O$ are generated via transformer 28 through the diode 29. The start-up voltage S is also sent to controller 42 via transformer 28. Then, the electrical signal extractor 40 retrieves either the feedback voltage DV from the output voltage $V_O$ or the detection voltage DS corresponding to the output current $I_O$, and send it to the controller 42 which generates the control signals C based on the feedback voltage DV or the detection voltage DS and the start-up voltage S. The duration between the moment the control signal C changes from negative to positive and the moment the control signal C changes from positive to negative determines the duration of the ON/OFF state of the electronic switch 38. The coupling element 34 transmits the control signal C from the secondary side to driver 36 in the primary side. When driver 36 receives the control signal C, it amplifies the control signal C to produce a first digital signal D1 and stops generating the first pulse signal P1. Finally, the electronic switch 38 receives the first digital signal D1 and accordingly changes its ON/OFF state to control the transformer 28 receiving the input voltage $V_{IN}$ thus regulating the output voltage $V_O$ and output current $I_O$ via the diode 29. In prior art, compensation circuit is necessary to compensate for gain margin and phase margin to ensure the stability of the output voltage of the device. The present invention does not require any compensation circuit, thus avoiding the complicated technology of gain margin and phase margin adjustment. Yet the present invention is able to detect the output voltage $V_O$ or the output current $I_O$ directly and to transmit the information to the primary side, using the information from the secondary side to determine the time for the switch on the primary side to turn on or off, therefore instantly regulating the output voltage and output current to attain a fast load transients response. Furthermore, the present invention utilizes the coupling element to transmit information from the output voltage or the output current from the secondary side to the primary side, thus does not need to use any encoder or decoder unit as well as encoding or decoding technology, while effectively isolating the signal on the primary side and on the secondary side, allowing the secondary side independent regulation of the output voltage $V_O$ and output current $I_O$.

Figure 4:
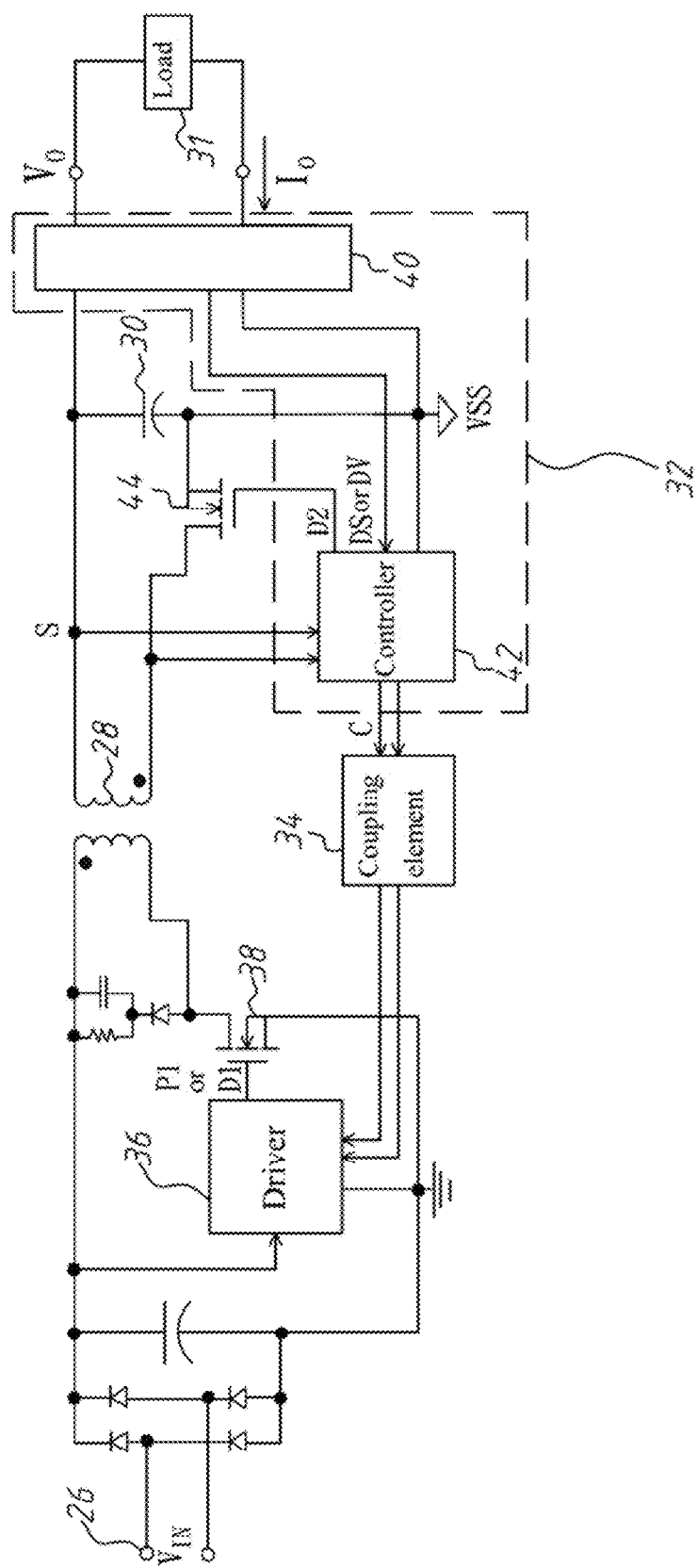
FIG. 4 is a circuit diagram of an isolated converter according to a second embodiment of the present invention.

FIG. 4 is a circuit diagram of an isolated converter according to a second embodiment of the present invention. Referring to FIG. 4, in order to improve the efficiency of the system, a second electronic switch 44, for example an N-channel power MOSFET, is replaced for the diode 29 of FIG. 2 as synchronous rectifiers. In this embodiment, the secondary side of the transformer 28 is connected directly to the load 31. Further, the second electronic switch 44 is connected between the secondary side of the transformer 28 and the load 31, and is connected to the controller 42. When the controller 42 generates the control signal C, it also generates a second digital signal D2, according to either the feedback voltage DV or the detection voltage DS and the start-up voltage S, and sends the second digital signal D2 to the second electronic switch 44 to change the ON/OFF state of the second electronic switch 44, such that the second electronic switch 44 is in opposite ON/OFF states of the first electronic switch 38 or both of the first electronic switch 38 and the second electronic switch 44 are turned off, hence the transformer 28 receives the input voltage $V_{IN}$ to regulate the output voltage $V_O$ and output current $I_O$.

The start-up mode operation of the system of FIG. 4 is described as follows. First, driver 36 receives an input voltage $V_{IN}$ from the input terminal 26 and then generates a first pulse signal P1 to the first electronic switch 38 thus the ON/OFF state of the switch 38 is changed accordingly to control the input voltage $V_{IN}$ applied to the transformer 28 and through the second electronic switch 44 generating the output voltage $V_O$ and output current $I_O$ across the load 31. Furthermore, the start-up voltage S is applied to the controller 42 via the transformer 28. Then, the electrical signal extractor 40 retrieves the feedback voltage DV of the output voltage $V_O$ or the detection voltage DS corresponding to the output current $I_O$ and sends to the controller 42 that also receives the start-up voltage S and thus generates the control signal C and the second digital signal D2. The duration for the ON/OFF state of the first electronic switch 38 is determined by the duration of the control signal C between the moment it changes from negative to positive and the moment it changes from the positive to negative. The second electronic switch 44 receives the second digital signal D2 and changes its ON/OFF state, and the coupling element 34 transmits the control signal C from the secondary side to the driver 36 on the primary side. When driver 36 receives the control signal C, it amplifies the control signal C to produce a first digital signal D1 and stops generating the first pulse signal P1. Finally, the first electronic switch 38 receives the first digital signal D1 and accordingly switches its ON/OFF state to control the transformer 28 receiving the input voltage $V_{IN}$ thus regulating the output voltage $V_O$ and output current $I_O$.

Figure 5:
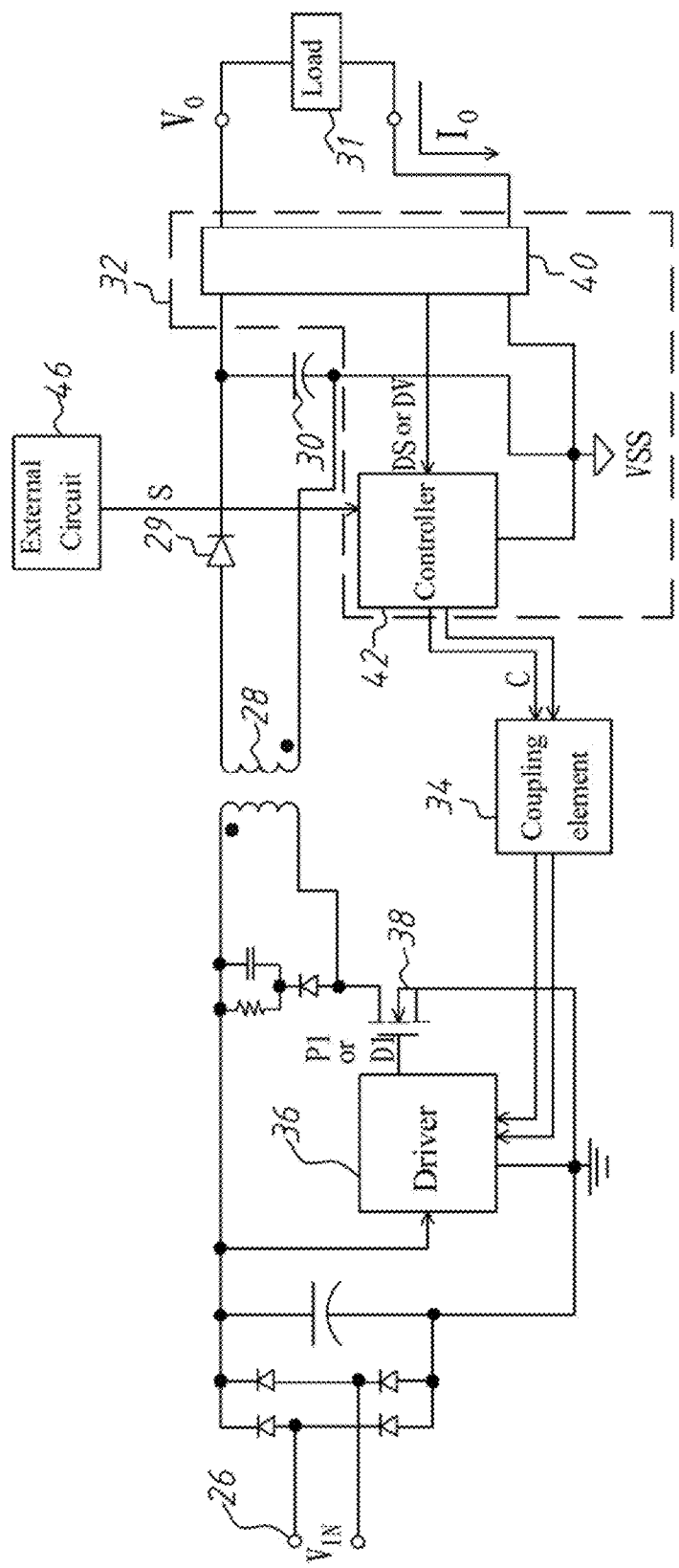
FIG. 5 is a circuit diagram of an isolated converter according to a third embodiment of the present invention.

FIG. 5 is a circuit diagram of an isolated converter according to a third embodiment of the present invention. Referring to FIG. 5, the start-up voltage S is applied to the controller 42 by an external circuit 46 connected to controller 42 instead of provided by the transformer 28 as described in FIG. 2. In operation, assuming the output voltage $V_O$ and output current $I_O$ already applied across the load 31 and the external circuit 46 already supplied the start-up voltage S onto the controller 42, thereafter the electrical signal extractor 40 retrieves and sends the feedback voltage DV of the output voltage $V_O$ or the detection voltage DS corresponding to the output current $I_O$ to the controller 42. Upon receiving the feedback voltage DV of the output voltage $V_O$ or the detection voltage DS corresponding to the output current $I_O$, together with the start-up voltage S, the controller 42 generates the control signal C accordingly, wherein the duration for the ON/OFF state of the first electronic switch 38 is determined by the duration of the control signal C between the moment it changes from negative to positive and the moment it changes from the positive to negative. Then, the coupling element 34 transmits the control signal C from the secondary side to the driver 36 on the primary side. Driver 36 receives the control signal C and amplifies it to produce a first digital signal D1 and sends the first digital signal D1 to the first electronic switch 38, which then accordingly changes its ON/OFF state to control the transformer 28 receiving the input voltage $V_{IN}$, hence regulating the output voltage $V_O$ and output current $I_O$ through the diode 29.

Figure 6:
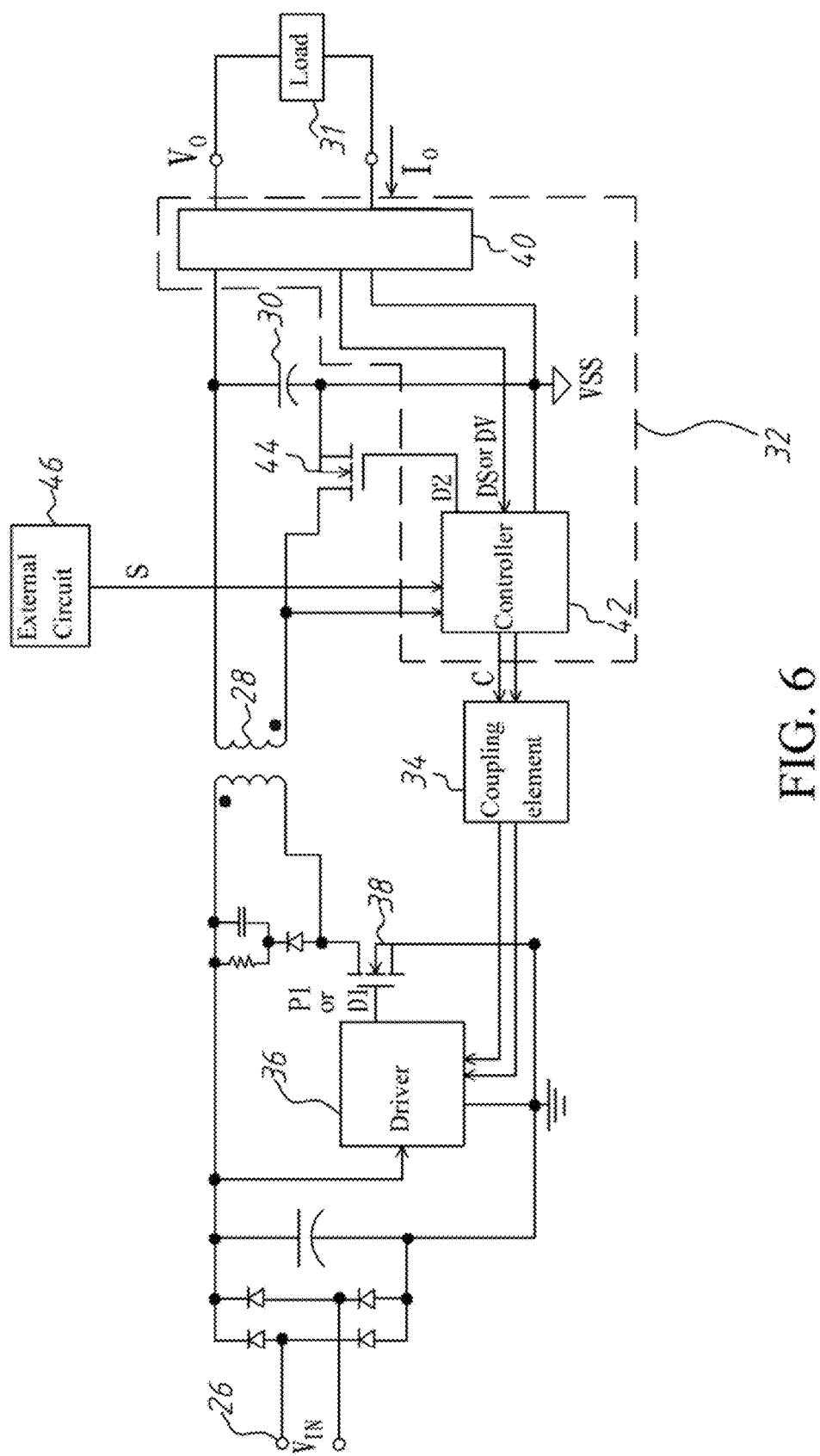
FIG. 6 is a circuit diagram of an isolated converter according to a fourth embodiment of the present invention.

FIG. 6 is a circuit diagram of an isolated converter according to a fourth embodiment of the present invention. As shown in FIG. 6, the start-up voltage S is applied to the controller 42 by an external circuit 46 instead of the transformer 28 as shown in FIG. 4. In operation, assuming the output voltage $V_O$ and output current $I_O$ already applied across the load 31 and the external circuit 46 already supplied the start-up voltage S to the controller 42, thereafter the electrical signal extractor 40 retrieves the feedback voltage DV of the output voltage $V_O$ or the detection voltage DS corresponding to the output current $I_O$ and sends it to the controller 42. Upon receiving the feedback voltage DV of the output voltage $V_O$ or the detection voltage DS corresponding to the output current $I_O$, together with the start-up voltage S, the controller 42 generates the control signals C and the second digital signal D2 accordingly, wherein the duration for the ON/OFF state of the first electronic switch 38 is determined by the duration of the control signal C between the moment it changes form negative to positive and the moment it changes from positive to negative. The second electronic switch 44 receives the second digital signal D2 to change its ON/OFF state, and the coupling element 34 transmits the control signal C from the secondary side to the driver 36 on the primary side. The driver 36 receives the control signal C and amplifies it to produce the first digital signal D1 that is then sent to the first electronic switch 38. The electronic switch 38 accordingly switches its ON/OFF state to control the transformer 28 receiving the input voltage $V_{IN}$ thus regulating the output voltage $V_O$ and the output current $I_O$.

Figure 7:
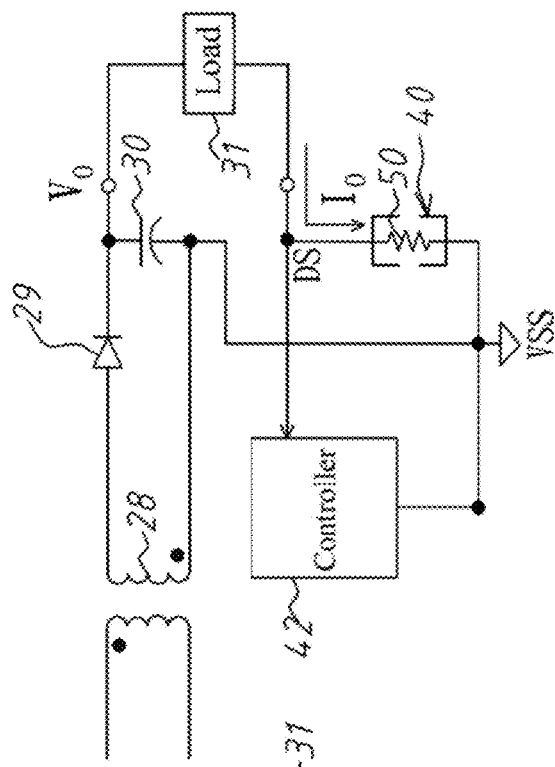
FIG. 7 is a circuit diagram of an electrical signal extractor, including a voltage divider, connecting to the controller, the output capacitor, the load and the transformer.
Figure 8:
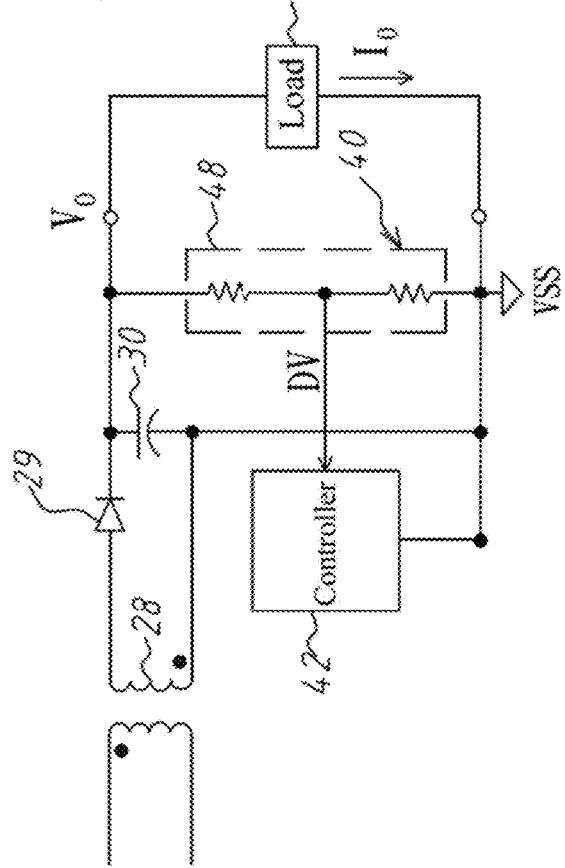
FIG. 8 is a circuit diagram of an alternative electrical signal extractor, including a resistor, connecting to the controller, the output capacitor, the load and the transformer.

FIG. 7 and FIG. 8 illustrate alternative circuit diagrams of the electrical signal extractor 40. As shown in FIG. 7, the electrical signal extractor 40 is in the form of voltage divider 48 that is connected to the secondary side of transformer 28 through the diode 29, or it can also be connected directly to the secondary side of the transformer 28, and is able to capture the feedback voltage DV of the output voltage $V_O$. As shown in FIG. 8, the electrical signal extractor 40 is a resistor 50 that is connected to the secondary side of transformer 28 through the diode 29, or it can also be connected directly to the secondary side of the transformer 28. When the output current $I_O$ flows through the resistance 50, the detection voltage DS is generated via the resistor 50.

Figure 9:
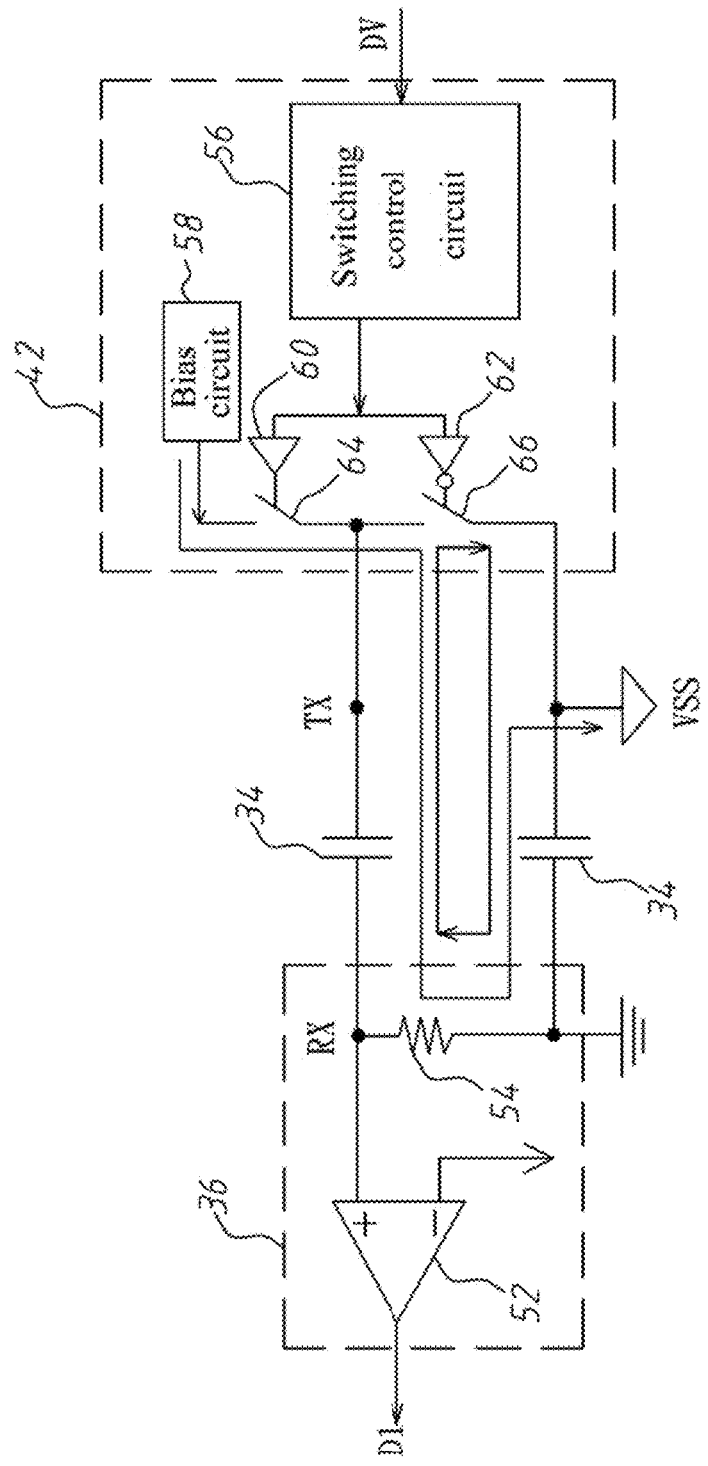
FIG. 9 is a circuit diagram showing the current flow between the controller and the driver.
Figure 10:
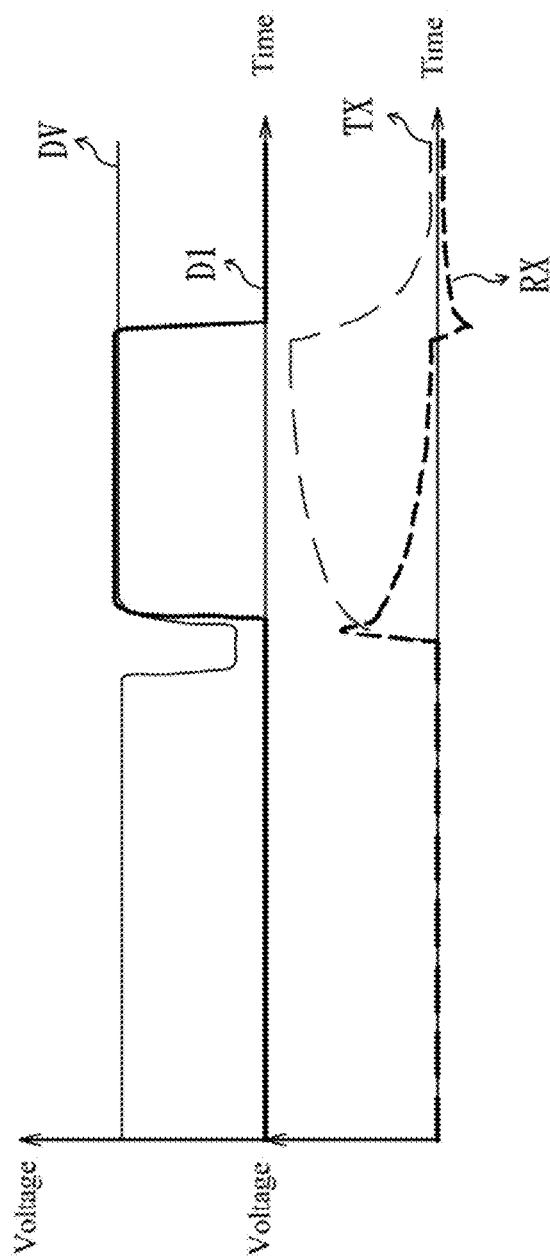
FIG. 10 shows the waveforms of the feedback voltage DV, the second digital signal D1, and RX and TX signals.

Referring to FIG. 9, driver 36 includes a comparator 52 and a resistor 54 connected at the positive input terminal of the comparator 52 while the other end of the resistor 54 is grounded. The controller 42 includes a switching control circuit 56, a bias circuit 58, a buffer 60, an inverter 62, a third electronic switch 64 and a fourth electronic switch 66. The switching control circuit 56 is connected to the buffer 60 and the inverter 62, which are connected to the third electronic switch 64 and fourth electronic switch 66 respectively. The bias circuit 58 is connected to the third electronic switch 64. The third electronic switch 64 and fourth electronic switch 66 are connected to resistor 54 through coupling elements 34. The signal between the resistor 54 and the positive input of comparator 52 is referred as the RX signal and the signal between the coupling element 34 and the third electronic switch 64 is referred as signals TX. The switching control circuit 56, through the buffer 60 and the inverter 62, controls the third electronic switch 64 and fourth electronic switch 66 so that their ON/OFF states are opposite. When feedback voltage DV is smaller than the reference voltage of controller 42, the switching control circuit 56 turns on the third electronic switch 64 and turns off the fourth electronic switch 66 through buffer 60 and the inverter 62, resulting in a current that is sent, by the bias circuit 58, across the third electronic switch 64, the coupling element 34, the resistor 54 and the coupling element 34 to the low potential VSS. The comparator 52 receives the RX signal, and thus generates a first digital signal D1. After a given period of time, the switching control circuit 56 turns off the third electronic switch 64 and turns on the fourth electronic switch 66 through buffer 60 and the inverter 62, hence the current flows sequentially through the coupling element 34, resister 54, coupling element 34 and the fourth electronic switch 66. The waveforms of the RX signal, TX signal, feedback voltage DV and the first digital signal D1 are shown in FIG. 10. As shown in the figure, when the feedback voltage DV is lower than the reference voltage, a high voltage level of the digital signal D1 is generated with very short delay time.

Figure 11:
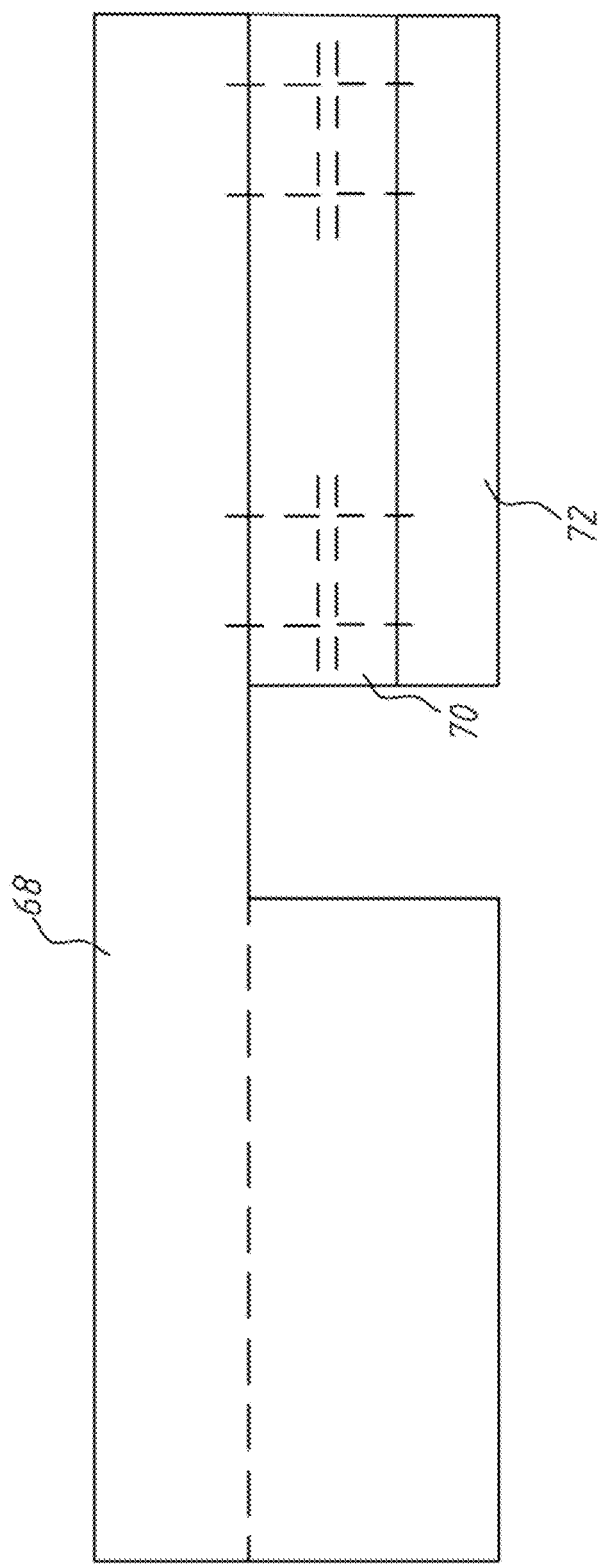
FIG. 11 is a schematic diagram of the package structure of the controller, the capacitor and the driver.

Referring to FIG. 9 and FIG. 11, to achieve a small size system, driver 36, the controller 42 and the coupling element 34 may be integrated in one package. As shown in FIG. 11, the package includes a first semiconductor chip 68, a dielectric layer 70 and a second semiconductor chip 72 stacked together. The first semiconductor chip 68 includes the controller unit 42, the second semiconductor chip 72 includes the driver 36, while the coupling element, for example a capacitor, are formed by a conductive layer on the first semiconductor chip 68, dielectric layer 70 and a conductive layer on the second semiconductor chip 72, where the conductive layer of the first semiconductor chip 68 and the second semiconductor chip t 72 can be a metal layer, or a lead frame. When the coupling element 34 is a transformer, a piezoelectric element or an optical coupling element, similar method can be used to integrate it into a package structure, in order to reduce the footprint on the printed circuit board, and the bill of material (BOM) cost.

In FIG. 8, the electrical signal extractor 40 is a resistor 50. Assuming the reference voltage of controller 42 is 250 mV, the DC component of the output current $I_O$ through the resistor 50 is 2.5 amps, which means the resistance of the resistor 50 must be set to 0.1 ohms, in order to output an accurate control signal C. However, the resistor 50 is in the main output path, so it cannot be too large, or else it will increase the loss in output efficacy; when the resistor is too small, the reference voltage of controller 42 must also be small, otherwise it is not able to determine the ripple signal of the output current $I_O$ in order to output an accurate control output signal C. However, when the reference voltage of the controller 42 is set very small, its circuit will be difficult to design.

Figure 12:
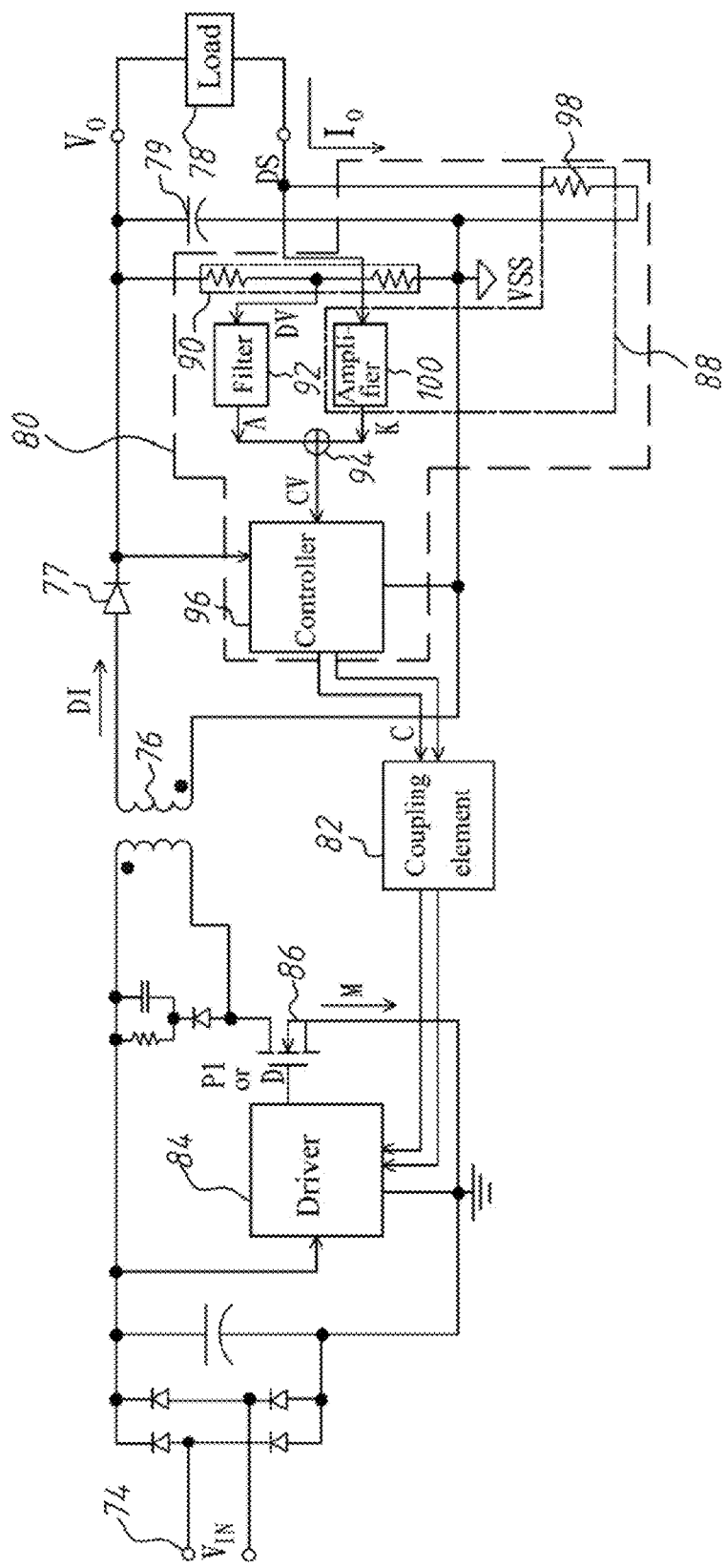
FIG. 12 is a circuit diagram of an isolated converter according to a fifth embodiment of the present invention.

FIG. 12 is a circuit diagram of an isolated converter according to a fifth embodiment of the present invention. Referring to FIG. 12, the constant on-time isolated converter is connected to an input terminal 74 to receive an input voltage $V_{IN}$. This constant on-time isolation converter comprises a transformer 76 with primary side and secondary side, where the primary side is connected to the input terminal 74 and the secondary side is connected to a diode 77, a load 78 and an output capacitor 79. The anode of the diode 77 is connected to the secondary side of transformer 76 while its cathode is connected to load 78 and the output capacitor 79. There is a ripple signal on the secondary side of the transformer 76, which results in an output voltage $V_O$ and an output current $I_O$ across the load 78. This ripple signal has an AC component and a DC component. The average value of the ripple signal voltage is the voltage value of the DC component. The voltage value of the AC component is obtained by subtracting the voltage value of the DC component from the voltage of the ripple signal. The cathode of diode 77, the secondary side of the transformer 76 and load 78 are connected to a processor 80, which captures the output AC voltage A of the AC component and the output current $I_O$ of the ripple signal. Processor 80 is preset with a reference voltage, the processor 80 converts the output current $I_O$ to a process voltage K. Since the output current $I_O$ is an AC/DC signal, the process voltage K is also an AC/DC voltage signal, with the DC component being much larger than the AC component. Therefore, the process voltage K includes an AC component and a DC component and its average voltage value is the voltage value of the DC component. The processor 80 utilizes a filter 92 to substrate the voltage value of the DC component of the feedback voltage DV, thus obtaining the AC voltage A of the AC component. The processor 80 presets the voltage value of the DC component of the process voltage K to be equal to or slightly higher than the reference voltage and generates a control signal C according to the AC voltage A and the process voltage K. For example, the processor 80 combines the AC voltage A and the process voltage K to generate a control voltage CV and based on this and the reference voltage generates the control signal C. The transmission medium between the primary side and the secondary side can be electrical, magnetic, piezoelectric or optical components. The processor 80 is connected to at least one coupling element 82, such as a capacitor, a transformer, a piezoelectric element or an optical coupling element, which is connected to the primary side and the secondary side of the transformer 76 to transmit the control signal C from the secondary side to the primary side. The input terminal 74, the primary side of the transformer 76 and the coupling element 82 are connected to a driver 84, which receives the control signal C and then amplifies it to generate a digital signal D. The primary side of the transformer 76 and the drive 84 are connected to an electronic switch 86, such as N-channel MOSFET or a bipolar junction transistor, which receives the digital signal D and accordingly changes its ON/OFF state to control the input voltage $V_{IN}$ received by the transformer 76, and then to regulate the output voltage $V_O$ and output current Jo through the diode 77, where the duration of the electronic switch 86 ON/OFF state is determined by the moment the control signal C changes from negative to positive and the moment it changes from positive to negative, for example, if the control signal C is a clock signal, when the clock signal changes from negative to positive, electronic switch 86 is turned on and remains on until the clock signal goes from positive to negative, i.e., the ON state of the electronic switch 86 is ended thus the electronic switch 86 is turned off and remains off until when the clock signal changes from negative to positive again, i.e., the OFF state of electronic switches 86 is ended, and it is turned on again.

Driver 84 receives the input voltage $V_{IN}$ from the input terminal 74 and generates a first pulse signal P1 to the electronic switch 86, which changes the ON/OFF state of the electronic switch 86 accordingly, to control the input voltage $V_{IN}$ received by transformer 76, which generates the ripple signal, the output voltage $V_O$ and the output current $I_O$ through diode 77. Then processor 80 generates a control signal C, sends it to the driver 84 through the coupling element 82, hence the driver 84 stops generating the first pulse signal P1.

Referring to FIG. 3B and FIG. 12, the processor 80 comprises a current-voltage converter 88, a voltage divider 90, a filter 92, an adder 94 and a controller 96. Current-voltage converter 88 is connected to a load 78 and retrieves and converts the output current $I_O$ into the process voltage K. Voltage divider 90 is connected to a low potential VSS, the cathode of diode 77, the secondary side of transformer 76 and the load 78. The voltage divider 90 receives the output voltage $V_O$ and captures the feedback voltage DV. Filter 92 is connected to the voltage divider 90, thus receives and filters the feedback voltage DV to produce AC voltage A. The adder 94 is connected to the filter 92 and the current-voltage converter 88, thus receives and combines the AC voltage A and process voltage K together to generate a control voltage CV. The controller 96, which has a preset reference voltage and a preset period Tmin, is connected to the low potential VSS, the coupling element 82, the adder 94, the secondary side of the transformer 76 and the load 78, so as to receive the control voltage CV, and with the reference voltage, generates the control signal C. When the control voltage CV is less than the reference voltage, within the preset period Tmin, the control signal C is a second pulse signal P2 of at least one cycle, where the voltage in each of the first half cycle of the second pulse signal is at a high voltage level and the voltage in each of the second half cycle is at a low voltage level. Then, at the end of the preset period Tmin, when the control voltage CV is greater than the reference voltage, the control signal C is at a low voltage level. Current-voltage converter 88 comprises a resistor 98 and an amplifier 100. The resistor 98 is connected to the load 78 and the low potential VSS, and the output current $I_O$ flows through the resistor 98 thus generating the detection voltage DS across the resistor 98. Amplifier 100 is connected to adder 94, load 78 and resistor 98, receives and amplifies the detection voltage DS generating the process voltage K.

In operation of this embodiment, firstly, the driver 84 receives the input voltage $V_{IN}$ from the input terminal 74 generating a first pulse signal P1 to the electronic switch 86, thus the ON/OFF state of the electronic switch 86 is changed accordingly, which controls the input voltage $V_{IN}$ received by the transformer 76 and through the diode 77 generating a ripple signal on the secondary side of the transformer 76, and at the same time generating an output voltage Vo and an output current Io across the load 78, and via transformer 76 providing power to the controller 96. Then, the output current flows through the resistor 98 generating the detection voltage DS across the resistor 98, in addition, the voltage divider 90 receives the output voltage Vo and captures the feedback voltage DV of the output voltage $V_O$. The amplifier 100 receives and amplifies the detection voltage DS and thus generates the process voltage K, while the filter 92 receives and filters the feedback voltage DV producing the AC voltage A. Then, the adder 94 receives and combines the AC voltage A and the process voltage K generating the control voltage CV. The controller 96 receives the control voltage CV and, with the reference voltage, generates the control signal C. For example, when the control voltage CV is less than the reference voltage, the control signal C, in the preset time period Tmin, is the second pulse signal P2 of at least one cycle. Then, at the end of the preset time period Tmin, when the control voltage CV is greater than the reference voltage, the control signal C is at a low voltage level. The controller 96 uses the duration between the crossing of the control signal C from negative to positive and from positive to negative to set the time for the ON/OFF state of the electronic switch 86. The coupling element 82 transmits the control signal C from the secondary side to the driver 84 of the primary side. When the driver 84 receives the control signals C, it stops generating the first pulse signal P1, and amplifies the control signal C to produce the digital signal D. Finally, the electronic switch 86 receives the digital signal D, and accordingly changes its ON/OFF state to control the input voltage $V_{IN}$ received by the transformer 76, and then through the diode 77 regulates the output voltage $V_O$ and output current $I_O$.

Figure 13:
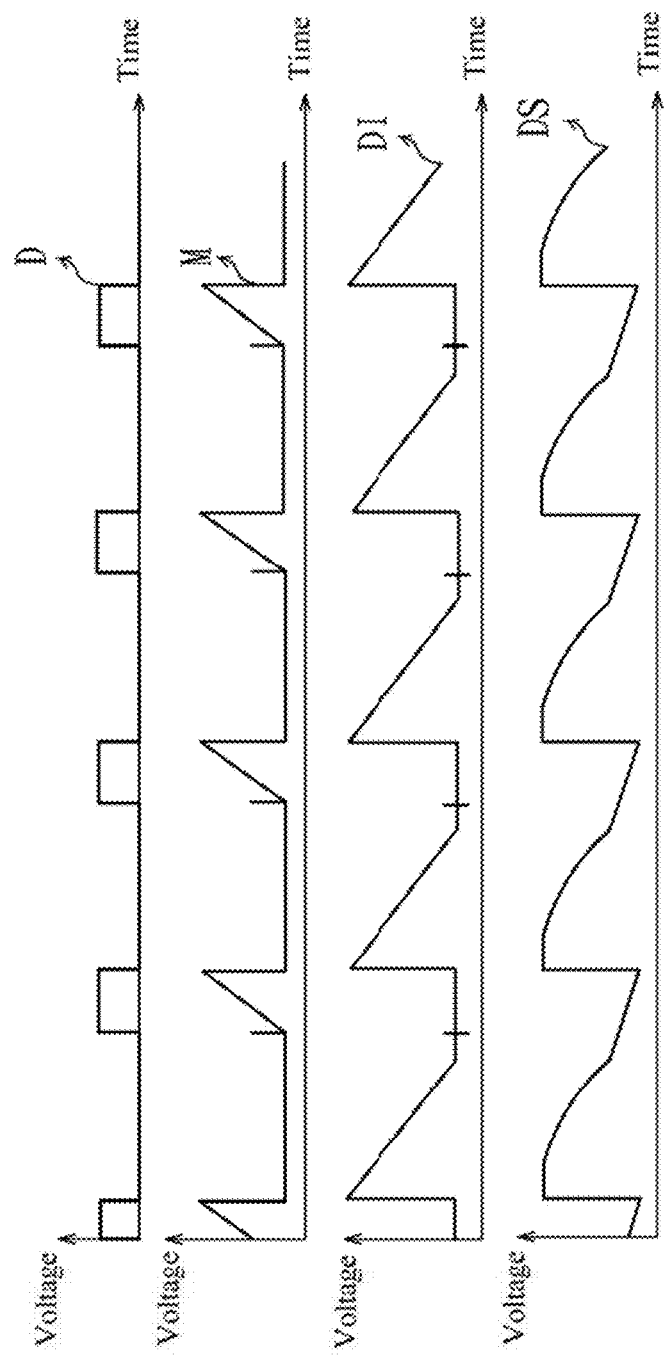
FIG. 13 shows the waveforms of D, M, DI and DS signals of the fifth embodiment of the present invention.

FIG. 13 displays the waveforms of the current M through the electronic switch 86, the current DI through the diode 77, the digital signal D and the detection voltage DS. The AC voltage A signal of the ripple signal is produced from the feedback voltage DV, but can also be obtained from the detection voltage DS or secondary diode current DI. In addition, referring to FIG. 8 and original setting of the reference voltage and output current $I_O$, the resistance of the resistor 50 must be set to 0.1 ohms. However, in this embodiment, by using voltage divider 90, filter 92, adder 94 and the amplifier 100, the resistance of the resistor 98 can be set to 10 milli-ohms to match the reference voltage of 25 mV and the DC component of the output current $I_O$ which is 2.5 amps. Thus, the loss of output efficacy is reduced, and the reference voltage of controller 96 need not be set very small, so that the circuit of controller 96 is easy to design.

Figure 14:
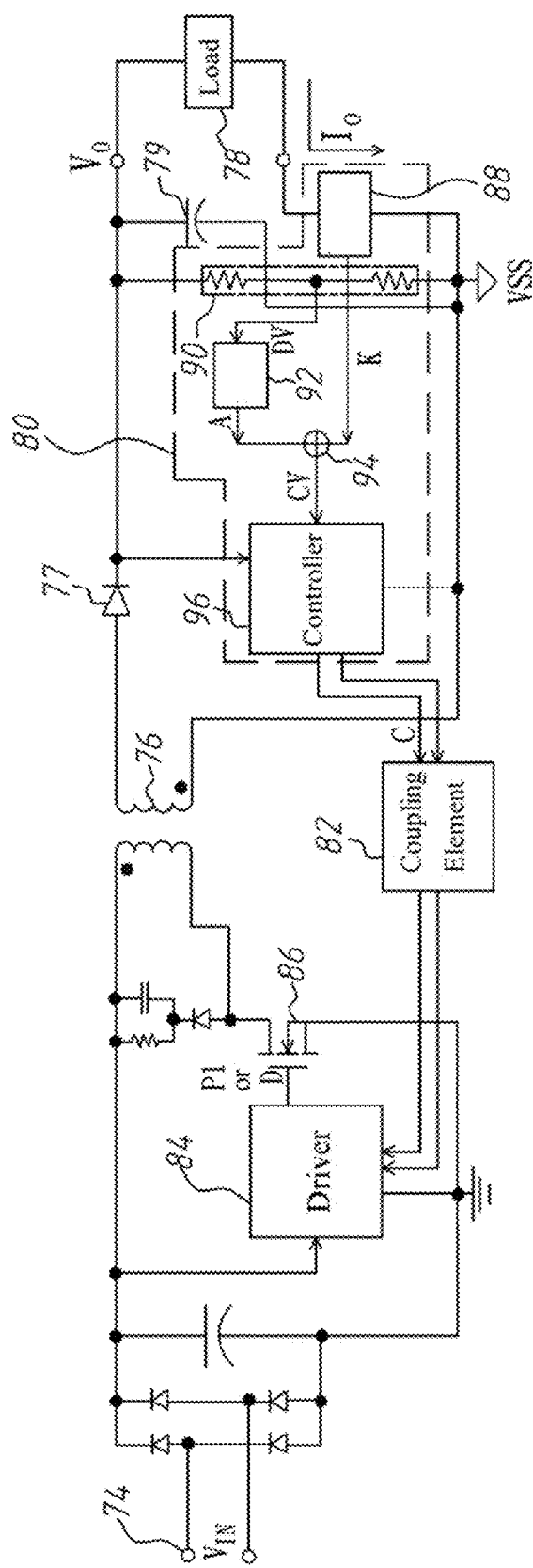
FIG. 14 is a circuit diagram of an isolated converter according to a sixth embodiment of the present invention.

FIG. 14 is a circuit diagram of an isolated converter according to a sixth embodiment of the present invention. Different from the fifth embodiment, where the current-voltage converter 88 consists of the resistor 98 and the amplifier 100, in this embodiment, the current-voltage converter 88 is a Hall element connected to the load 78 to retrieve the output current $I_O$ and, by adjusting the appropriate magnetic field, the output current $I_O$ is converted to the process voltage K. The operations of other components of the system are the same as that in the fifth embodiment.

Referring back to FIG. 4, during the start-up mode, the first electronic switch 38 receives the first pulse signal P1 generated by driver 36 and thus its ON/OFF state is changed to control the power supplied to the controller 42 provided by transformer 28, so that controller 42 generates the control signal C and the second digital signal D2 synchronously. Theoretically, the first electronic switch 38 and the second electronic switch 44 receive the control signal C and the second digital signal D2 respectively such that their ON/OFF states are opposite. However, if the coupling member 34 is damaged, the control signal C cannot be transmitted from the secondary side to the primary side. Since the driver 36 does not receive the control signals C, it will continue to generate the first pulse signal P1 to the first electronic switch 38. As a result, the first electronic switch 38 and the second electronic switch 44 are unable to synchronize, and may even be turned on at the same time, resulting in damage to the entire system.

Figure 15:
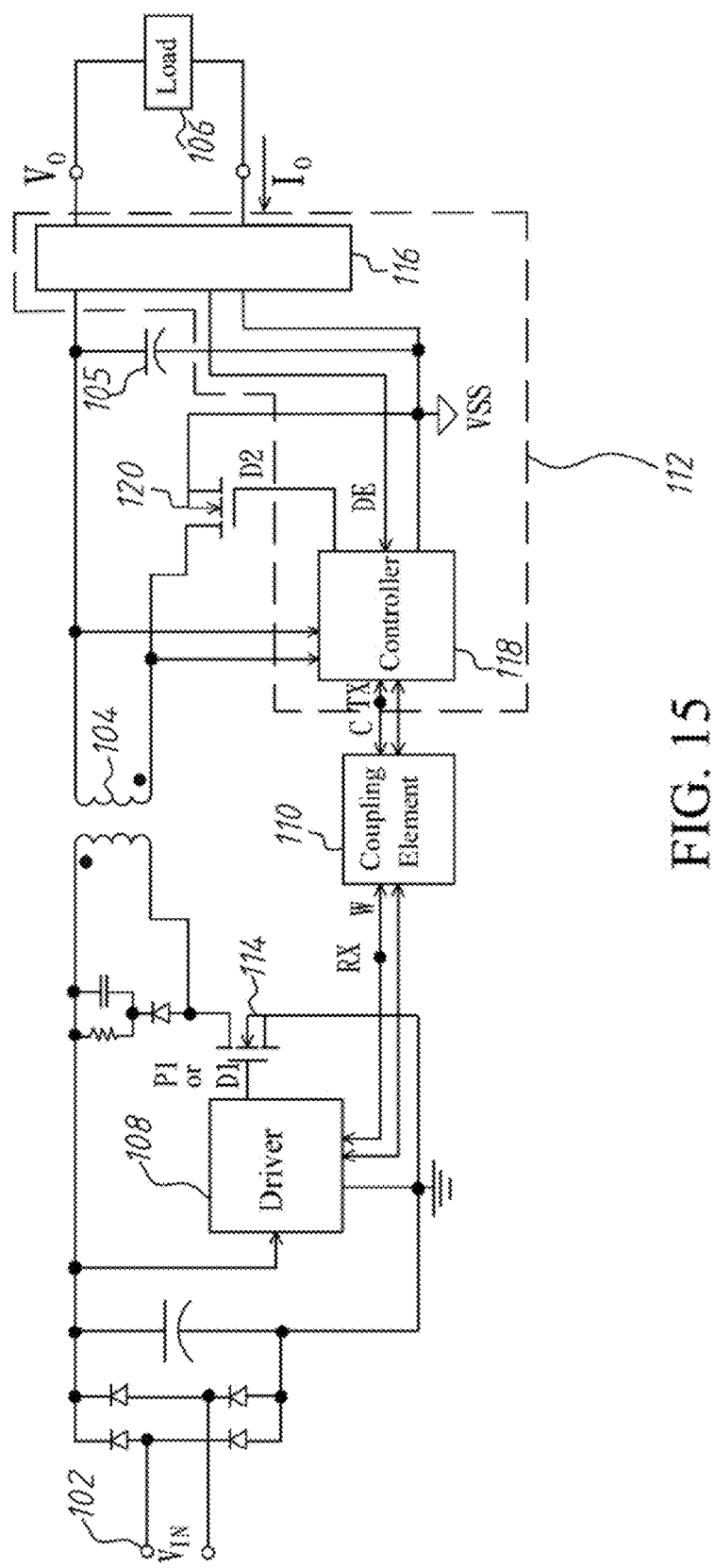
FIG. 15 is a circuit diagram of an isolated converter according to a seventh embodiment of the present invention.

The problem mentioned above is solved by the system of FIG. 15 according to a seventh embodiment of the present invention. As shown in FIG. 15, the constant on-time isolated converter is connected to an input terminal 102 to receive an input voltage $V_{IN}$. The constant on-time converter comprises a transformer 104 with its primary side connected to the input terminal 102 and its secondary side connected to an output capacitor 105 and a load 106 with an output voltage $V_O$ and an output current $I_O$ applying across the load 106. The primary side of transformer 104 and input terminal 102 are connected to a driver 108 to receive an input voltage $V_{IN}$ thus generating a plurality of wake-up signals W sequentially. Driver 108 is connected to at least one coupling element 110, such as capacitors, transformers, a piezoelectric element or an optical coupling element, which is connected to the primary side and the secondary side of transformer 104, to transmit the wake-up signal W to the secondary side. The coupling element 110, the secondary side of the transformer 104, a low potential VSS, the output capacitor 105 and the load 106 are connected to processor 112, which receives either the output voltage $V_O$ or output current $I_O$ and the wake-up signal W, and generates and transmits a control signal C to the driver 108 via the coupling element 110, thus the driver 108 amplifies the control signal C to produce a first digital signal D1. The primary side of the transformer 104 and driver 108 are connected to a first electronic switch 114, such as N-channel MOSFET or a bipolar junction transistor, which receives the first digital signal D1 and accordingly changes its ON/OFF state to control the input voltage $V_{IN}$ received by the transformer 104 from inputs terminal 102, thereby regulating the output voltage $V_O$ and output current $I_O$. Specifically, when the first electronic switch 114 is turned on, the transformer 104 starts to store energy thus the output voltage decreases. When the first electronic switch 114 is turned off, the transformer 104 starts to release energy thus the output voltage increases. Additionally, the on/off duration of the first electronic switch 114 is determined from the instance the control signal C on the secondary side crossing from the negative to positive to the instance the control signal C crossing from positive to negative. For example, when the control signal C is a clock signal, when it crosses from the negative to positive, the first electronic switch 114 is turned on and remains on until the clock signal crosses from positive to negative. At this time the ON state of the first electronic switch is ended and it is turned off, and remains off until the clock signal crosses from negative to positive, i.e., when the OFF state is ended, thus the first electronic switch 114 is turned on again. Driver 108 receives an input voltage $V_{IN}$ from the input terminal 102 generating a first pulse signal P1 to the first electronic switch 114, as such the first electronic switch 114 changes its ON/OFF state accordingly to control the input voltage $V_{IN}$ received by the transformer 104 and produce an output voltage $V_O$ and output current $I_O$ flowing across load 106, and via the transformer 104 provides power to the processor 112 to generates the control signal C. When the first electronic switch 114 is turned on, transformer 104 stores energy, the output capacitor 105 provides energy to the processor 112 to generate the control signal C and generates the output voltage $V_O$ and output current $I_O$. When the first electronic switch 114 is turned off, the transformer 104 starts to release the stored energy to the output capacitor 105 and provides energy to the processor 112 to generate the control signal C, and thus the transformer 104 produces the output voltage $V_O$ and output current $I_O$. Next, when the driver 108 receives the control signal C through the coupling element 110, it stops generating the first pulse signal P1 and the wake-up signal W.

Figure 16:
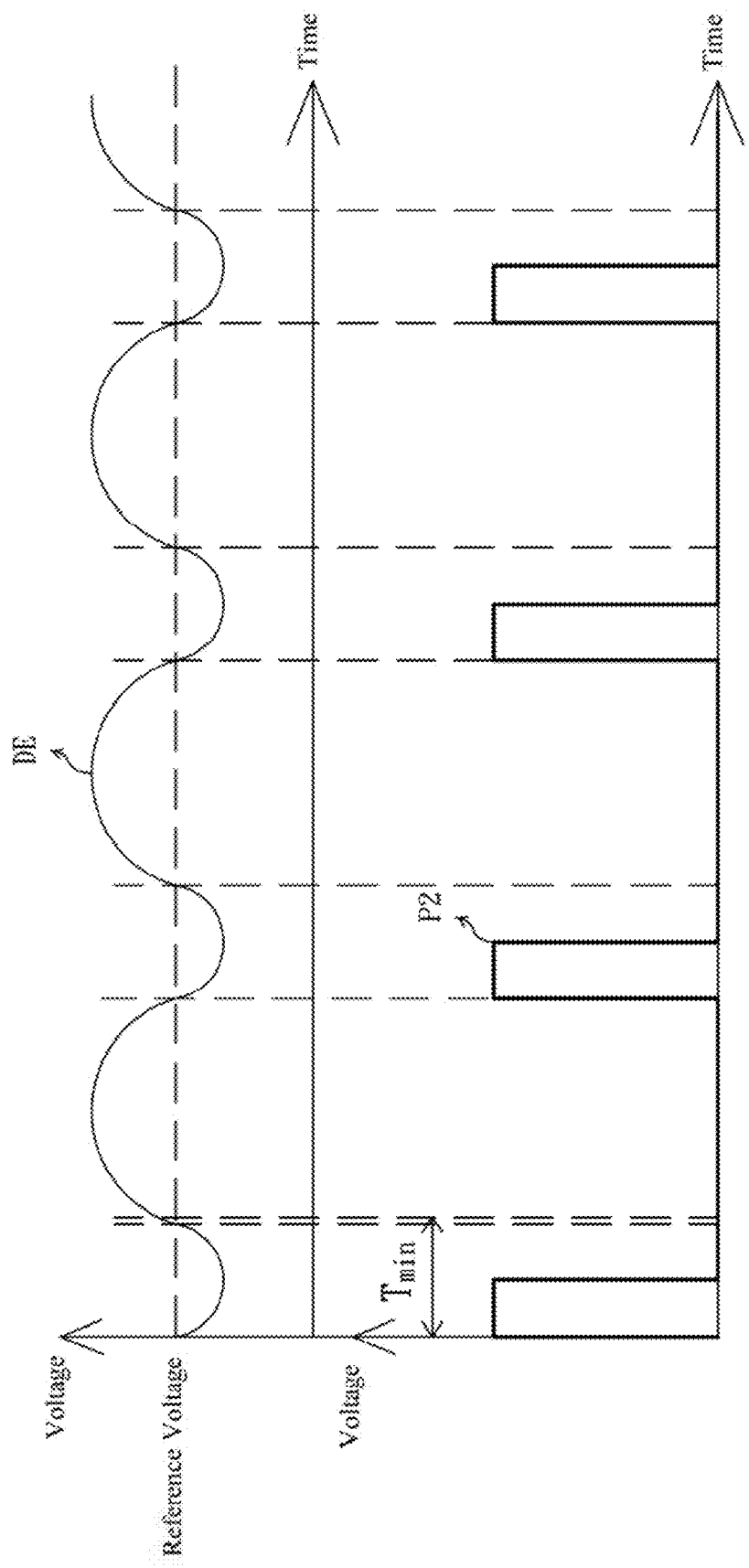
FIG. 16 shows the waveform of the detection voltage and the control signal of the present invention.

In FIG. 15, the processor 112 comprises an electrical signal extractor 116 and a controller 118. Electrical signal extractor 116 is connected to a low potential VSS, the secondary side of the transformer 104 and load 106 to capture the output voltage Vo or the detection voltage DE corresponding to the output current Io. The controller 118 is connected to the coupling element 110, the secondary side of the transformer 104 and electrical signal extractor 116 to receive the detection voltage DE and the wake-up signal W, and then generates the control signal C based on the detection voltage signal DE and wake-up signal W. Referring to FIG. 15 and FIG. 16, since the controller 118 is preset with a reference voltage, when the detection voltage DE is smaller than the reference voltage, the control signal C within a preset period $T_{min}$ is a second pulse signal P2 of at least one cycle, in which the voltage in each of the first half cycle of the second pulse signal P2 is at a high voltage level, and in each of the second half cycle is at a low voltage level. Then, at the end of a preset time period $T_{min}$, when detection voltage DE is larger than the reference voltage, the control signal C is at a low voltage level.

A second electronic switch 120, such as N-channel MOSFET, is connected to the secondary side of transformer 104, the load 106, the controller 118, the low potential VSS and the electrical signal extractor 116. When the controller 118 generates the control signal C, it also generates a second digital signal D2 based on the detection voltage signal DE and the wake-up signal W to the second electronic switch 120, thus changing the ON/OFF states of the second electronic switch 120 so that the first electronic switch 114 and the second electronic switch 120 are in opposite ON/OFF states or both are turned off, as such the transformer 104 receives the input voltage $V_{IN}$ to regulate the output voltage $V_O$ and output current $I_O$.

The start-up operation of the seventh embodiment is described as follows. First, driver 108 receives an input voltage $V_{IN}$ from an input terminal 102 generating a first pulse signal P1 to the first electronic switch 114, thus changing the ON/OFF state of the electronic switch 114 accordingly to control the input voltage $V_{IN}$ received by the transformer 104, and through the second electronic switch 120 to produce an output voltage $V_O$ and output current $I_O$ on the load 106. Meanwhile, based on the first pulse signal P1, the first electronic switch 114 provides energy to the controller 118 via transformer 104, while driver 108 produces a wake-up signal W using the input voltage. Then, electrical signal extractor 116 captures either the output voltage $V_O$ or detection voltage DE corresponding to the output current $I_O$ and then send to the controller 118. Controller 118 receives the wake-up signal W, through the coupling elements 110, and the detection voltage DE, and with the energy supplied by transformer 104 generates a control signal C and the second digital signal D2 accordingly, and the duration between the instance the control signal C crossing from negative to positive to the instance when the control signal crossing from positive to negative is used to determine the duration for switching the ON/OFF state of the first electronic switch 114. Then, the second electronic switch 120 receives the second digital signal D2 and changes its ON/OFF state, and the coupling element 110 transmits the control signal C from the secondary side to the driver 108 in the primary side. When driver 108 receives the control signal C, it stops generating first pulse signal P1 and the wake-up signal W, and amplifies the control signal C to produce a first digital signal D1. Finally, the first electronic switch 114 receives the first digital signal D1, and accordingly changes its ON/OFF state to control the input voltage $V_{IN}$ received by the transformer 104, hence regulating the output voltage $V_O$ and output current $I_O$.

Figure 17:
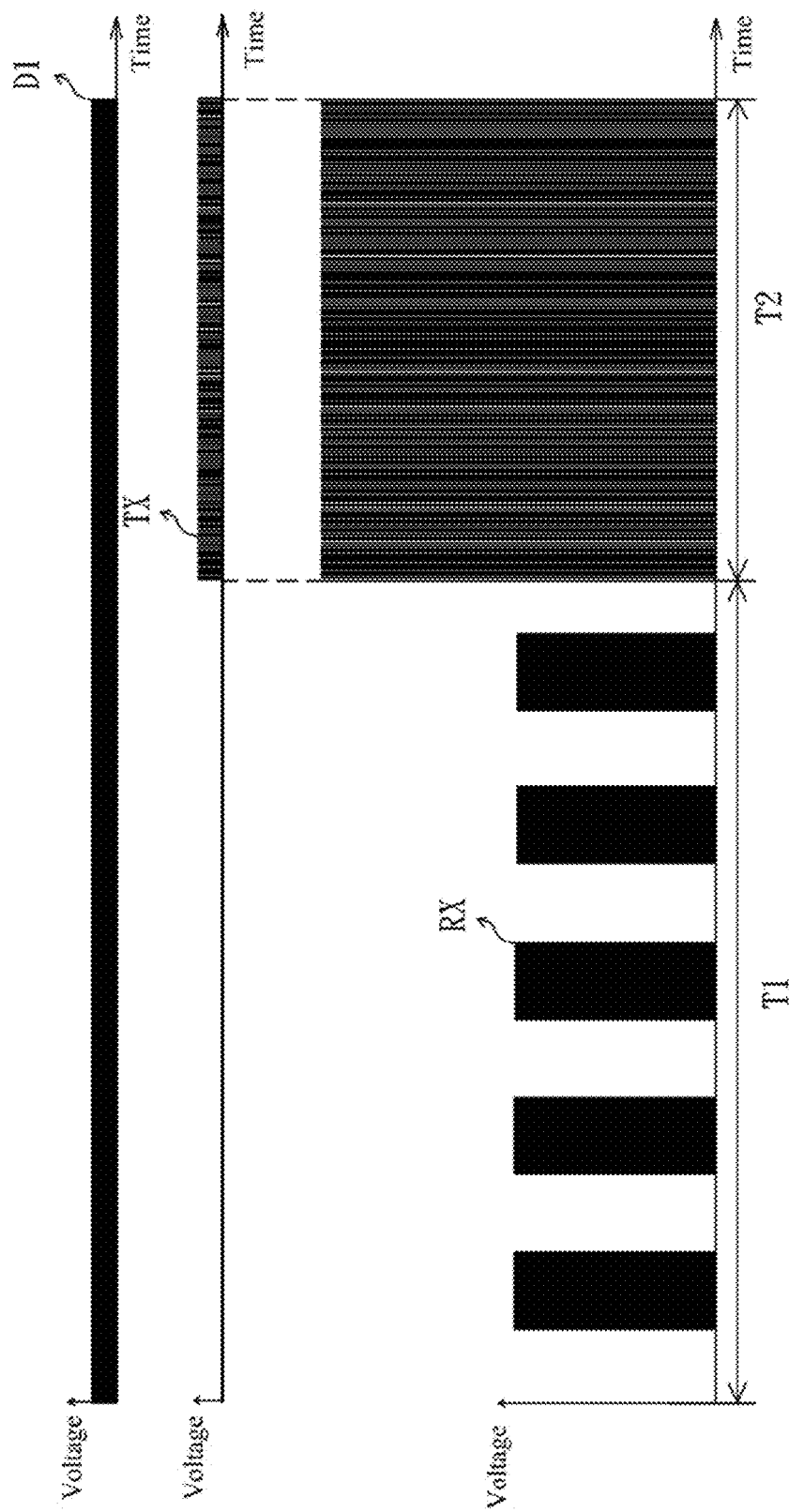
FIG. 17 shows the waveform of D1 signal, TX signal and RX signal.

Referring to FIG. 15 and FIG. 17, the signal between the coupling element 110 and the driver 108 is referred to as the RX signal and that between the coupling member 110 and the controller 118 as the TX signal, as such TX signal also represents the control signal C. During period T1, in which RX signal represents a complex wakeup signal W, the controller 118 has not yet received wake-up signal W, so there is no TX signal generation. Next, in period T2, since the controller 118 receives the wake-up signal W, it generates a control signal C and transfers it through a coupling element 110 to the driver 108. Therefore, at this time the signal RX will be synchronized with the TX signals. On the other hand, if the coupling element 110 is damaged, the wake-up signal W cannot be transmitted through the coupling element 110 to the controller 118. If controller 118 does not receive the wake-up signal W, it will not be able to generate the control signal C and the second digital signal D2, then the whole system will not be operated, hence avoiding damage to the system.

In FIG. 2, when the system operates in discontinuous mode, the switching frequency of the first electronic switch 38 is represented by formula (1):

$$f = \frac{2 \times I_o \times L \times V_o}{V_{IN}^2 \times t_{on}^2} \quad (1)$$

Where $V_{IN}$ is the input voltage, $V_O$ is the output voltage, $I_O$ is the output current, L is the inductance of the transformer 28, $t_{on}$ is the on-duration when the first electronic switch 38 is turned on. When the load 31 is unchanged, and if $t_{on}$ also remains unchanged, then the switching frequency f is inversely proportional to the input voltage $V_{IN}$. Thus, when the input voltage $V_{IN}$ increases, the switching frequency f will decrease accordingly. However, when the switching frequency is too low, the transformer 28 becomes saturated, there will be no inductance, and then it will be burned.

Figure 18:
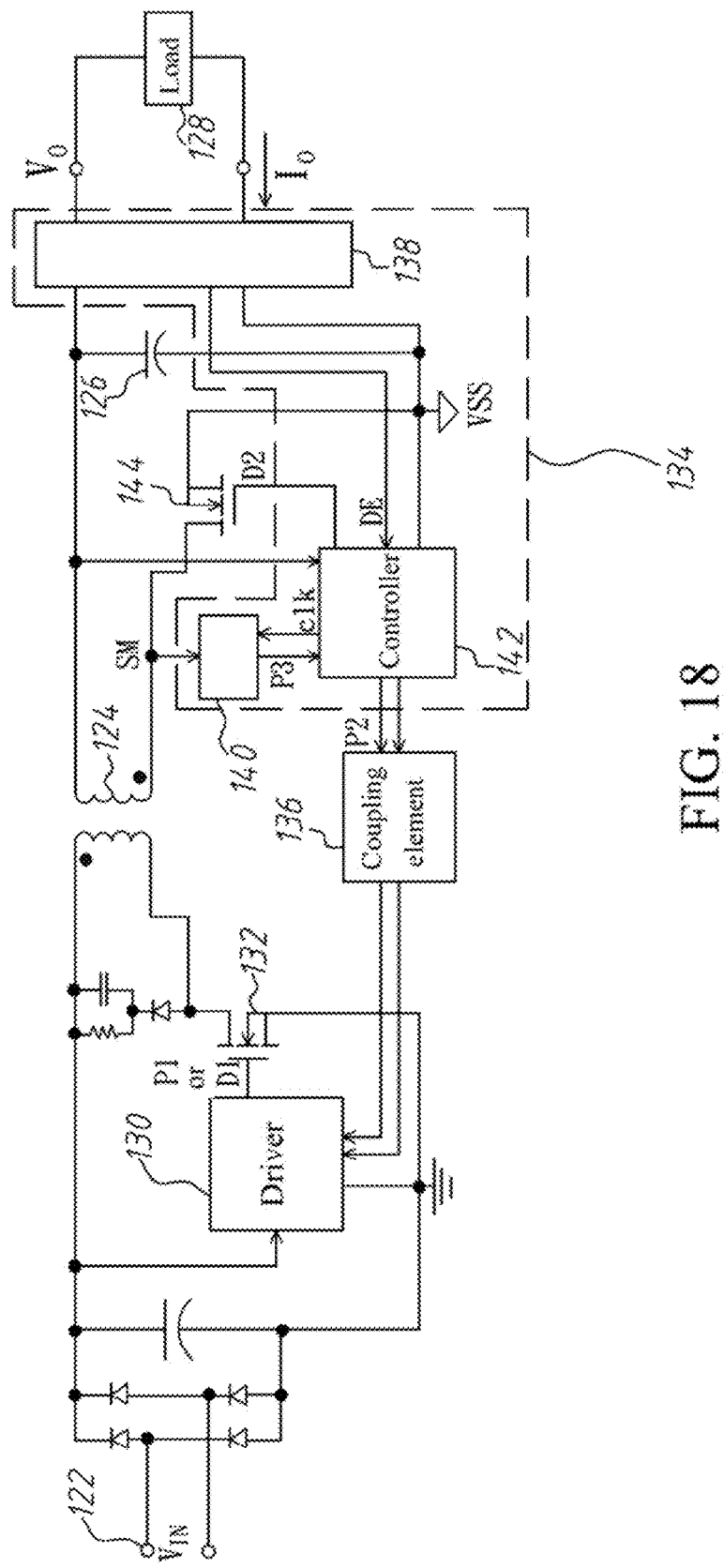
FIG. 18 is a circuit diagram of an isolated converter according the eighth embodiment of the present invention.
Figure 19:
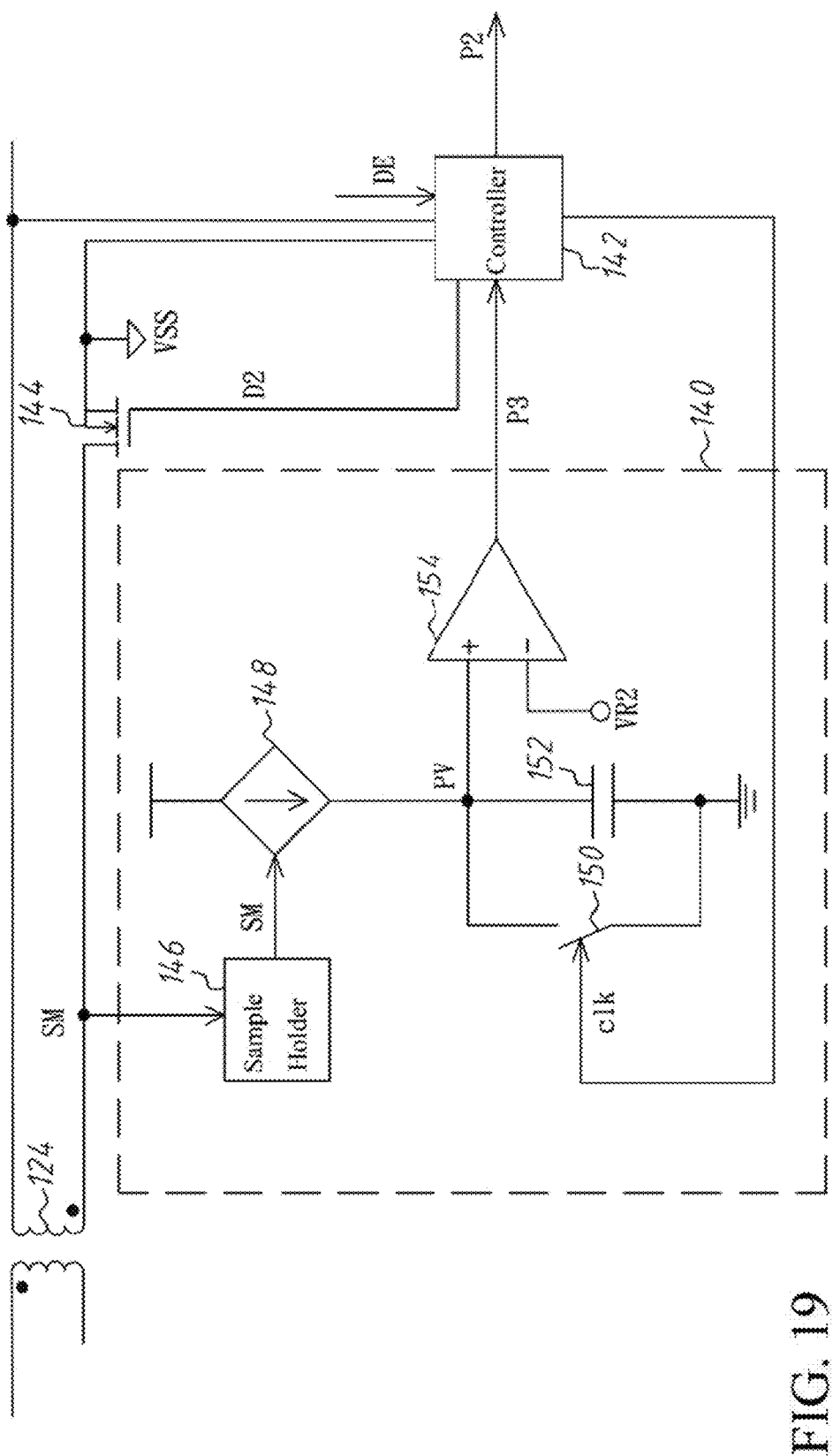
FIG. 19 is the internal circuit diagram of the on-time regulator and other components of the isolated converter of the eighth embodiment of the present invention.
Figure 20:
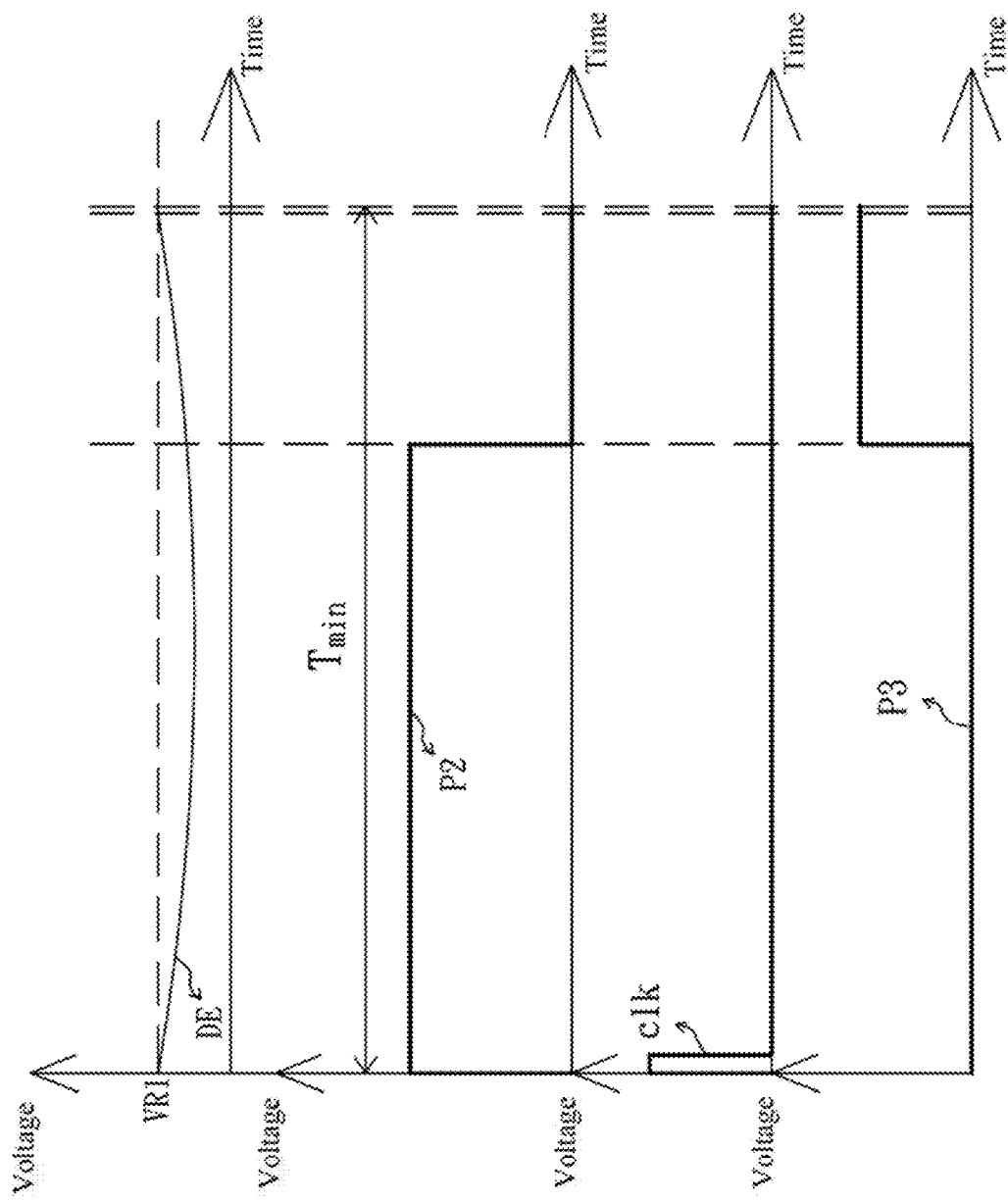
FIG. 20 shows the waveforms of DE, P2, clk and P3 signals of the eighth embodiment of the present invention.

FIGS. 18-20 illustrate the eighth embodiment of the present invention, which can reduce the degree of changes to the switching frequency in response to different input voltages to avoid damage to the system. The constant on-time isolated converter of the present invention is connected to an input terminal 122 to receive an input voltage $V_{IN}$. This constant on-time isolated converter comprises a transformer 124 with a primary side and a secondary side, where the primary side is connected to the input terminal 122 and the secondary side is connected to an output capacitor 126 in parallel to load 128. A driver 130 is connected to the input terminal 122 and receives an input voltage $V_{IN}$ generating a first pulse signal P1. Driver 130 and the primary side of the transformer 124 are connected to a first electronic switch 132, such as N-channel MOSFET or a bipolar junction transistor, which receives the first pulse signal P1 and accordingly changes its ON/OFF state to control the input voltage $V_{IN}$ received by the transformer 124 to produce an output voltage $V_O$ and an output current $I_O$ across load 128, and also controls the sampling voltage SM containing the input voltage $V_{IN}$ generated on the secondary side of transformer 124. A processor 134 is connected between the secondary side of the transformer 124 and the load 128, and is preset with a first reference voltage VR1 and a period $T_{min}$. Processor 134 receives either the output voltage $V_O$ or the output current $I_O$, the sampling voltage SM, and also captures the detection voltage DE corresponding to either the output voltage $V_O$ of the output current $I_O$. When the detection voltage DE is less than the first reference voltage VR1, processor 134 generates a second pulse signal P2 within the preset period $T_{min}$ according to the input voltage $V_{IN}$ in the sampling voltage SM. This second pulse signal P2 is of at least one cycle in which its voltage in each of the first half cycle is at a high voltage level, and that in each of the second half cycle is at a low voltage level. Processor 134 and driver 130 are connected to the coupling element 136, which can be capacitors, transformers, piezoelectric element or optical coupling element. Coupling element 136 is positioned between the primary side and the secondary side, where the coupling element 136 transmits the second pulse signal P2 to the driver 130 at the primary side to stop the driver 130 from generating the first pulse signal P1. The driver 130 further amplifies the second pulse signal P2 to generate a first digital signal D1 and transmits the first digital signal D1 to the first electronic switch 132. The first electronic switch 132 changes its ON/OFF state accordingly to control the input voltage $V_{IN}$ received by transformer 124 from the input terminal 122 for regulating the output voltage $V_O$ and output current $I_O$. The duration of the first electronic switch 132 ON/OFF state is determined from the instance the second pulse signal P2 at the secondary side crosses from negative to positive to the instance it crosses from positive to negative, for example when the second pulse signal P2 is a clock signal, at the time it crosses from negative to positive, the first electronic switch 132 is turned on and remains on until the clock signal crosses from the positive to negative, i.e., the first electronic switch's ON state is ended and it is turned off. The first electronic switch remains off until the clock signal crosses from negative to positive, hence the first electronic switch 132 is turned on again. Since the ON/OFF state duration of the first electronic switch 132 is dependent on the second pulse signal P2, which is dependent on the input voltage $V_{IN}$, the settings for the second pulse signal P2 and the input voltage $V_{IN}$ can be adjusted such that the higher the input voltage $V_{IN}$, the shorter time the first electronic switch 132 remaining in ON state, and the lower the input voltage, the longer time the first electronic switch 132 staying in ON state.

As shown in FIG. 18, the processor 134 comprises an electrical signal extractor 138, an on-time regulator 140 and a controller 142. The electrical signal extractor 138 connects to a low potential VSS, the secondary side of the transformer 124 and the load 128 to receive the output voltage $V_O$ or output current $I_O$, and to extract the detection voltage DE. The on-time regulator 140 is connected to the secondary side of the transformer 124 to receive and captures the sampled voltage SM. The controller 142 is connected to a low potential VSS, the on-time regulator 140, a coupling element 136, the secondary side of the transformer 124 and the electrical signal extractor 138. The controller 142 is preset with a first reference voltage VR1 and a period $T_{min}$ to receive a detection voltage DE. When the detection voltage DE is less than the first reference voltage VR1, the controller 142 generates a second pulse signal P2 and a clock signal clk corresponding to the preset period $T_{min}$. When the system is operating in the discontinuous mode, the switching frequency of the first electronic switch 132 is represented by formula (2):

$$f = \frac{2 \times I_o \times L \times V_o}{V_{IN}^2 \times t_{on}^2} \quad (2)$$

Where $V_{IN}$ is the input voltage, $V_O$ is the output voltage, $I_O$ is the output current, L is the inductance of the transformer 124, $t_{on}$ is the time of the first electronic switch 132 remaining the ON state. To avoid the transformer 28 being saturated when the switching frequency is too low, in this embodiment, when the input voltage is higher, the on-time of the first electronic switch 132 is shorter and vice versa, thus reducing the changes in the switching frequency due to different input voltage $V_{IN}$.

The clock signal clk is a positive pulse signal when the second pulse signal P2 crosses from negative to positive, while the clock signal clk is a low level signal at other times. The on-time regulator 140 receives the clock signal clk and, together with the input voltage $V_{IN}$, generates and transmits a third pulse signal P3 to the controller 142 so that when the third pulse signal P3 changes from negative to positive, the second pulse signal P2 changes from positive to negative and remains negative at least until the end of the preset period $T_{min}$, and then when the clock signal appears as the next positive pulse signal, the second pulse signal P2 will again changes from negative to positive. A second electronic switch 144, such as N-channel MOSFET, is connected between the secondary side of the transformer 124 and the load 128 and also to the controller 142. When the controller 142 generates the second pulse signal P2, it also generates a second digital signal D2 accordingly to the second electronic switch 144, thus the ON/OFF state of the first electronic switch 132 and the second electronic switch 144 are opposite or both are turned off. To capture the input voltage $V_{IN}$, the on-time regulator 140 can be connected to any node at the secondary side of the transformer 124, for example, it may be connected between the second electronic switch 144 and the transformer 124 and when the second electronic switch 144 is off, the on-time regulator 140 receives the sampled voltage SM between the second electronic switch 144 and the transformer 124.

As shown in FIG. 19, the on-time regulator 140 comprises a sample holder 146, a dependent current source 148, a third electronic switch 150, a capacitor 152 and a comparator 154. Sample holder 146 is connected to the secondary side of the transformer 124 to receive and capture the sampled voltage SM. The dependent current source 148 is connected to the sample holder 146 to receive the sample voltage SM generating a dependent current based on the input voltage $V_{IN}$ in sampled voltage SM. To achieve shorter ON-state time of the first electronic switch when the input voltage is higher and vice versa, the dependent current source is designed such that when the input voltage is higher, the dependent current is also larger and when the input voltage is lower, the dependent current is smaller. The third electronic switch 150 is connected to the controller 142 and dependent current source 148 receiving the clock signal clk, and is turned on when the positive pulse signal appears but is turned off at other times. Capacitor 152 is connected in parallel with the third electronic switch 150 and is connected in series to the dependent current source 148 for receiving a dependent current depending on the ON/OFF state of the third the electronic switch 150 to store a dependent voltage PV. The capacitor 152 connects to the comparator 154 and the controller 142 receiving a second reference voltage VR2 at its negative input terminal and receiving the dependent voltage PV at its positive input terminal respectively, thereby producing a third pulse signal P3.

The start-up mode of operation of system in FIG. 18 is described as follows. First, driver 130 receives the input voltage $V_{IN}$ from the input terminal 122 generating a first pulse signal P1 to the first electronic switch 132, which changes its ON/OFF states accordingly to control the input voltage $V_{IN}$ received by transformer 124 to produce an output voltage $V_O$ and output current $I_O$ on load 128 through the second electronic switch 144. Meanwhile, the first pulse signal P1 changes the ON/OFF state of the first electronic switch 132 to control sampling voltage SM containing the input voltage $V_{IN}$ generated at the secondary side of transformer 124. When the first pulse signal P1 is at a high level signal, the first electronic switch 132 is turned on and the transformer 124 stores energy while the output capacitor 126 supplies energy to generate an output voltage $V_O$ and an output current $I_O$. When the first pulse signal P1 is at a low level signal, the first electronic switch 132 is turned off and the transformer 124 releases energy to generate an output voltage $V_O$, an output current $I_O$ and a sampling voltage SM, while the energy is stored in the output capacitor 126.

Then, the electronic signal extractor 138 captures the detection voltage DE corresponding to either the output voltage $V_O$ or the output current $I_O$ and sends it to controller 142. The controller 142 receives the detected voltage DE, and when the detection voltage DE is less than the first reference voltage VR1, the controller 142 generates a second pulse signal P2 and a corresponding clock signal clk during the preset period $T_{min}$, and also generates and transfers a second digital signal D2 according to the second pulse signal P2 to the second electronic switch 144 to change its ON/OFF state. Meanwhile, the on-time regulator 140 starts operating, while the second electronic switch 144 is in OFF state. The first the sample holder 146 receives the sampling voltage SM thus captures the input voltage $V_{IN}$ from the sampling voltage SM. Then, the dependent current source 148 receives the input voltage $V_{IN}$ and generates a dependent current accordingly. Since the clock signal clk is a positive pulse signal, when the second pulse signal P2 changes from negative to positive and is a low level signal, when the third electronic switch 150 receives the clock signal clk, the switch 150 is only turned on when the positive pulse signal appears otherwise it remains in OFF state. In other words, at the start of the second pulse signal P2, the third electronic switch 150 is turned on, so that the voltage of the capacitor 152 is zero, then the dependent current charges capacitor 152, to a dependent voltage PV. Finally, the comparator 154 receives the second reference voltage VR2 and the dependent voltage PV thus generating the third pulse signal P3. When the dependent voltage PV is equal to the second reference voltage VR2, the third pulse signal P3 will change from negative to positive, then the controller 142 changes the second pulse signal P2 from positive to negative, thus the second pulse signal P2 remains in the negative until the end of the preset period $T_{min}$, hence when the positive pulse signal of the clock signal clk occurs, the second pulse signal P2 changes from negative to positive. The second pulse signal P2 is transmitted from the secondary side to the driver 130 at the primary side through the coupling element 136 so that driver 130 stops generating the first pulse signal P1. Finally, the driver 130 amplifies the second pulse signal P2, generates a first digital signal D1, and transmits it to the first electronic switch 132, which then changes its ON/OFF state accordingly to control the input voltage $V_{IN}$ received by the transformer 124, thereby regulating the output voltage $V_O$ and output current $I_O$. Specifically, when the first digital signal D1 is a low level signal, the first electronic switch 132 is in the OFF state, hence transformer 124 increases the output voltage $V_O$ and output current $I_O$. When the first digital signal D1 is a high level signal, the first electronic switch 132 is turned on, and transformer 124 reduces the output voltage $V_O$ and output current $I_O$.

With reference to FIG. 2 and formula (1), when the load 31 is a light load, $I_O$ will decrease, so the switching frequency will decrease accordingly. When the switching frequency reaches 20-20 k hertz (Hz), it can be easily detected by human ear. To avoid this problem, whenever load 31 is a light load, $t_{on}$ needs to be decreased. This is described below in the ninth embodiment of the present invention shown in FIGS. 21-23.

Figure 21:
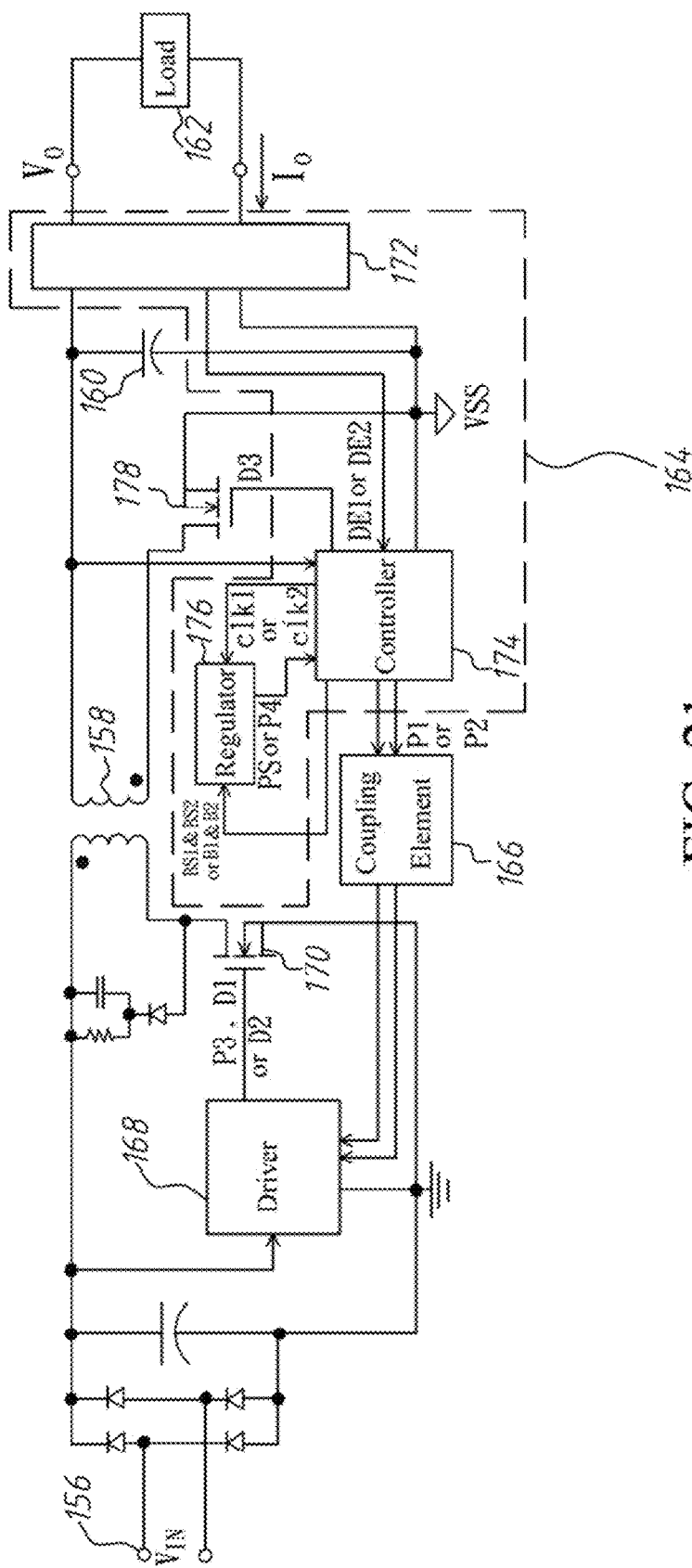
FIG. 21 is a circuit diagram of an isolated converter according to a ninth embodiment of the present invention.

As shown in FIG. 21, the constant on-time isolated converter is connected to an input terminal 156 and receives an input voltage $V_{IN}$, which comprises a transformer 158 with its primary side connected to the input terminal 156, and its secondary side connected to an output capacitor 160, which is connected to a low potential VSS, and to a load 162 with an output signal, including an output voltage $V_O$ and an output current $I_O$, crossing the load 162. The secondary side of the transformer 158 and load 162 are connected to a processor 164 that is preset with a time period $T_{min}$, a first reference voltage VR1, a low threshold frequency and a high threshold frequency. Processor 164 receives the output signal from the load 162, and sequentially captures the first detection voltage DE 1 and second detection voltage DE2 from the output signal. When the first detection voltage DE1 is less than the first reference voltage VR1, the processor 164 generates a first pulse signal P1 and a synchronized first clock signal clk1 of the same frequency within the preset period $T_{min}$. Then, when the second detection voltage DE2 is less than the first reference voltage VR1, based on at least one frequency F of the first clock signal clk1, the low threshold frequency and the high threshold frequency, processor 164 generates a second pulse signal P2 and a synchronized second clock signal clk2 of the same frequency within the preset period $T_{min}$. The second pulse signal P2 is of at least one cycle, where the voltage in each of the first half cycle of the second pulse signal P2 is at a high voltage level and the voltage in each of the second half cycle is at a low voltage level. Processor 164 is connected to at least one coupling element 166, which can be capacitors, transformers, piezoelectric element or optical coupling element. Coupling element 166 is connected to both the primary side and secondary side of the transformer 158 and transmits the first pulse signal P1 and the second pulse signal P2 sequentially from secondary side to the primary side. The primary side of the transformer 158 and coupling element 166 is connected to a driver 168, which sequentially receives the first pulse signal P1 and the second pulse signal P2, amplifies them, then respectively generates the first digital signal D1 and the second digital signal D2. The primary side of the transformer 158 and the driver 168 is connected to a first electronic switch 170, such as N-channel MOSFET or a bipolar junction transistor. The first electronic switch 170 sequentially receives the first signal digital D1 and the second digital signal D2, and accordingly changes its ON/OFF state to control the input voltage $V_{IN}$ received from the input terminal 156, thereby regulating the output signal. The duration for the ON/OFF state of the first electronic switch 170 is determined between the moment the first pulse signal P1 changes from negative to positive and the moment the first pulse signal P1 changes from positive to negative, or between the moment the second pulse signal P2 changes from negative to positive and the moment the second pulse signal P2 changes from positive to negative. For example, when the first pulse signal P1 is the clock signal and changes from negative to positive, the first electronic switch 170 is turned on and remains on until the clock signal goes from positive to negative, i.e., when its ON state is ended, and thus the electronic switch 170 is turned off and remains off until the clock signal changes from negative to positive, i.e., when its OFF state is ended, and thus the electronic switch 170 is turned on again. Similarly, when the second pulse signal P2 is a clock signal and changes from negative to positive, the first electronic switch 170 is turned on and remains on until the clock signal changes from positive to negative, i.e., the ON state of the first electronic switch 170 is ended and thus the electronic switch 170 is turned off. The electronic switch 170 remains off until the clock signal changes from negative to positive again, i.e., when the OFF state of the first electronic switch 170 is ended and thus the electronic switch 170 is turned on again.

When the first electronic switch 170 is operating in the discontinuous mode, its switching frequency is represented by formula (3):

$$f = \frac{2 \times I_o \times L \times V_o}{V_{IN}^2 \times t_{on}^2} \qquad (3)$$

Where $V_{IN}$ is the input voltage, $V_O$ is the output voltage, $I_O$ is the output current, L is the inductance of the transformer 158, $t_{on}$ is the time for the ON state of the first electronic switch 170. To avoid the switching frequency f from falling into the human audible zone and creating noise problem, if there is only one frequency F that is lower than the low threshold frequency, i.e., the first electronic switch 170 receives the first digital signal D1 and is turned on, the design of the isolated converter in FIG. 21 allows the on-time $t_{on}$ of the first electronic switch 170 to be longer when it is controlled by the first digital signal D1 than when it is controlled by the second digital signal D2 to turned on. On the other hand, if F is higher than the high threshold frequency, the on-time $t_{on}$ of the electronic switch 170 controlled by the first digital signal D1 is shorter than the on-time of the electronic switch 170 when it is controlled by the second digital signal D2. As such, if the first electronic switch 170 receives the first digital signal D1 and the switching frequency falls into the audible zone, when it receives the second digital signal D2 the switching frequency will be outside the audible zone, thus the noise problem is solved.

When there is a plurality of frequencies F, the processor 164 has multiple features including a low threshold value, a high threshold value, an initial value corresponding to the first pulse signal P1 and a counting condition. The counting condition is that when a frequency F is below the lower threshold frequency, the initial value increases by 1, and when a frequency F is higher than the high threshold frequency, the initial value decreases by 1. Processor 164 uses either the low threshold frequency or the high threshold frequency and the counting condition to evaluate each of frequency F sequentially to obtain a total value. In addition, a total value that is greater than the high threshold value is rounded down to the high threshold value, and a total value that is less than the low threshold value is rounded up to the low threshold value. Furthermore, the initial value, the low threshold value, the high threshold value and the total value are all greater than or equal to zero, represented by at least one or more binary bits. For example, if the low threshold value is 00, the high threshold value is 11, the initial value is 00, and there are 5 frequencies F each respectively is: lower than low threshold frequency, higher than high threshold frequency, lower than low threshold frequency, higher than high threshold frequency, lower than low threshold frequency, which results in a total value of 01. Using the same value for the low threshold value, the high threshold value, the initial value, but 5 different frequencies F, all of which are higher than the high threshold frequency, thus resulting in a total value smaller than the low threshold value, therefore the total value is 00. Again, using the same parameters but a different set of 5 frequencies F each of which is lower than the low threshold frequency, the total value is greater than the high threshold value, so the total value is 11.

The processor 164 generates a second pulse signal P2 and the second clock signal clk2 according to the total value. Similarly, to reduce noise when the switching frequency is in the audible zone, when the total value is larger than the initial value, the on-time for the first electronic switch 170 controlled by the first digital signal D1 is longer than that controlled by the second digital signal D2. When the total value is less than the initial value, the on-time for the first electronic switch 170 controlled by the first digital signal D1 is shorter than that controlled by the second digital signal D2. When the total value is equal to the initial value, the on-time for the first electronic switch 170 controlled by the first digital signal D1 equals to the on-time for the first electronic switch 170 controlled by the second digital signal D2. In addition, the greater the difference between the total value and the initial value, the greater the difference between the on-time of the first electronic switch 170 controlled by the first digital signal D1 and that controlled by the second digital signal D2.

The driver 168 is connected to the input terminal 156 to receive an input voltage $V_{IN}$, thereby generating a third pulse signal P3 to the first electronic switch 170, which changes the ON/OFF state of the switch 170 accordingly to control the transformer 158 receiving the input voltage $V_{IN}$ from the input terminal 156, thus producing an output signal to the load 162 and further controlling the generation of the first pulse signal P1 and the second pulse signal P2 by the processor 164 via transformer 158. When the driver 168 receives the first pulse signal P1, it stops producing the third pulse signal P3.

The processor 164 comprises an electrical signal extractor 172, a controller 174 and an on-time regulator 176. The electrical signal extractor 172 is connected to a low potential VSS, the secondary side of the transformer 158 and load 162, and receives the output signal to capture the first detection voltage DE1 and second detection voltage DE2 sequentially. The controller 174 is connected to coupling elements 166, the secondary side of the transformer 158 and the electrical signal extractor 172. The controller 174 is preset with a predetermined period $T_{min}$, the first reference voltage VR1, the counting condition, the low threshold frequency, the high threshold frequency, the initial value, the low threshold value and the high threshold value, and receives the first detection voltage DE1 and the second detection voltage DE2 sequentially. When the first detection voltage DE1 is less than the first reference voltage VR1, the controller 174 generates the first pulse signal P1 and the first clock signal clk1 within the preset period $T_{min}$, and uses either the low threshold frequency or the high threshold frequency and the counting condition to evaluate each of the frequency F chronologically in order to obtain the total value. Then, when the second detection voltage DE2 is less than the first reference voltage VR1, the controller 174, based on the total value, generates the second pulse signal P2 and the second clock signal clk2 within the preset period $T_{min}$. The second clock signal clk2 is a positive pulse signal when the second pulse signal P2 changes from negative to positive; otherwise it is a low value signal. The on-time regulator 176 is connected to controller 174 to receive the total value and the second clock signal clk2 and then generates a fourth pulse signal P4 based on the total value and the second clock signal clk2, so that when the fourth pulse signal P4 changes from negative to positive, the second pulse signal P2 changes from positive to negative and thus remains negative until the end of the preset period $T_{min}$. The second electronic switch 178, such as N-channel MOSFET, is connected between the secondary side of the transformer 158 and the load 162 and is also connected to the low potential VSS and controller 174. When the controller 174 generates the first pulse signal P1 or the second pulse signal P2, a third digital signal D3 is also generated to the second electronic switch 178 to change the ON/OFF state of the first electronic switch 170 and the second electronic switch 178 so that they are in opposite ON/OFF states or both are in OFF state.

Figure 22:
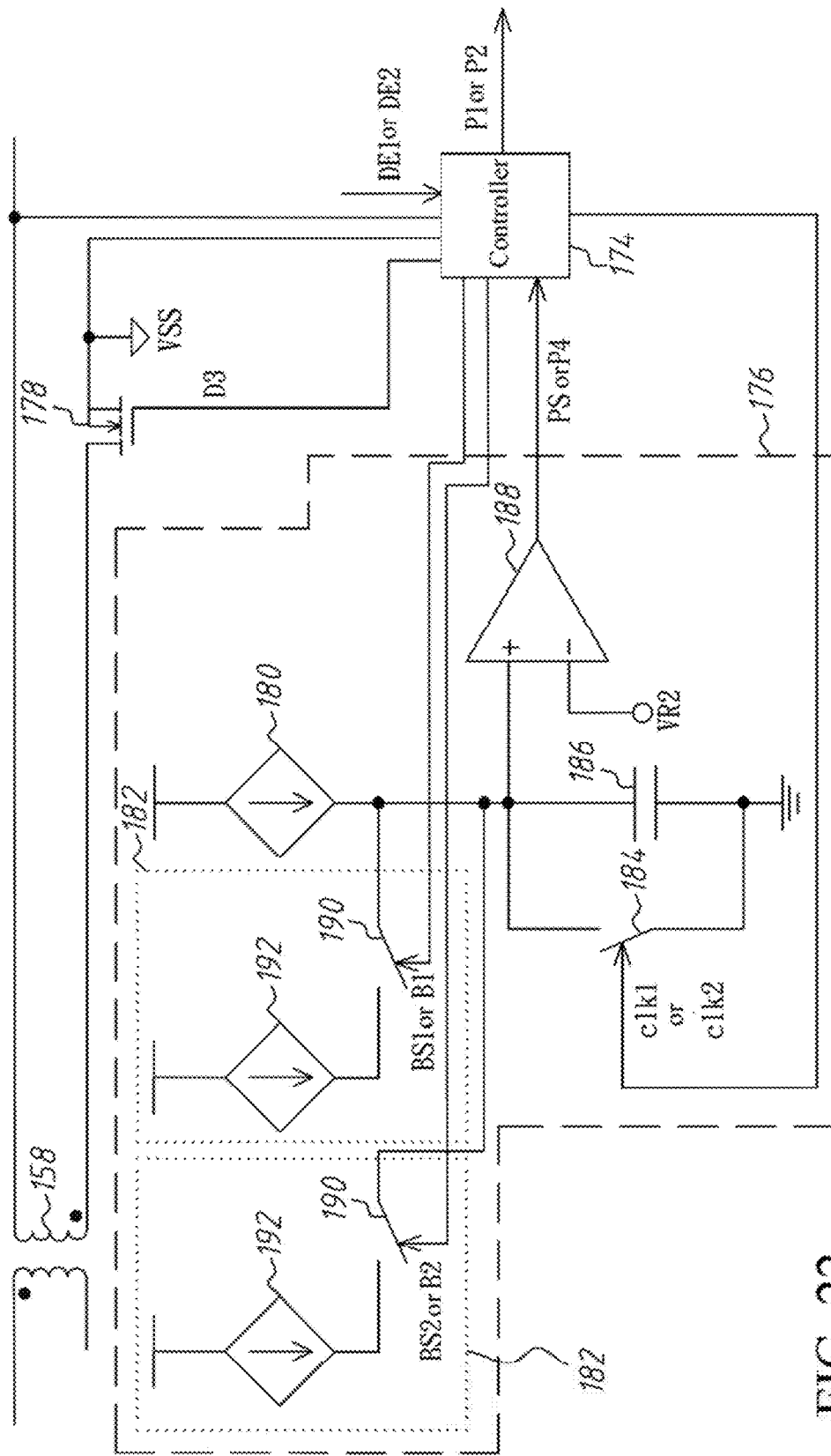
FIG. 22 is the internal circuit diagram of the on-time regulator and other components of the ninth embodiment of the present invention.

As shown in FIG. 22, the on-time regulator 176 comprises a first current source 180, at least one current generator 182, a third electronic switch 184, a capacitor 186 and a comparator 188. The first current source 180 generates a first current, and the current generator 182 is connected to the controller 174 to receive the bits B1, B2 for the total value, and thus accordingly generates at least one second current or zero current. Third electronic switch 184 is connected to controller 174, the first current source 180 and the current generator 182. The third electronic switch 184 receives the first clock signal clk1 and is instantly turned on when the first clock signal clk1 is a positive pulse signal; otherwise the third electronic switch 184 is turned off in the rest of time. Alternatively, the third electronic switch 184 receives the second clock signal clk2 and is instantly turned on when the second clock signal clk2 is a positive pulse signal; otherwise the third electronic switch 184 is turned off in the rest of time. Capacitor 186 and the third electronic switch 184 are connected in parallel and are connected to the first current source 180 and the current generator 182. According to the ON/OFF state of the third electronic switch 184, capacitor 186 receives the first current and either the second current or zero-current and thus stores a dependent voltage. The positive input terminal of the comparator 188 is connected to capacitor 186 to receive the dependent voltage and the negative input terminal receives a second reference voltage VR2, while the output terminal of the comparator 188 is connected to the controller 174. The comparator 188 generates an initial pulse signal PS or the fourth pulse signal P4 according to the dependent voltage stored in the capacitor 186 and the second reference voltage VR2.

In an alternative embodiment, the on-time regulator 176 comprises a plurality of current generators 182, which after receiving the bits B1, B2 of the total value generate a plurality of second currents respectively. When the bit is 0, the corresponds current generator 182 produces a zero current, while when the bit is 1, the corresponding current generator 182 generates the second current with a magnitude corresponding to a binary power of the bit in the plural binary bits of the total value. In FIG. 22, the on-time regulator 176 comprises two current generators 182 generating two second currents respectively, where one current generator 182 receives a lower bit B1 of the total value, and the other current generator 182 receives the higher bit B2 of the total value. Since the first current is continuously generated, the second current is larger with higher total value. In other words, when the total value is higher, the time taken for the dependent voltage stored in the capacitor 186 to reach the second reference voltage VR2 is shorter, leading to a shorter duration for the second pulse signal P2 with high voltage level, hence the on-time for the first electronic switch 170 after receiving the second digital signal D2 is shorter, avoiding the audible zone and reducing the noise component.

As shown in FIG. 22, each current generator 182 comprises a fourth electronic switch 190 and a second current source 192. The fourth electronic switch 190 is connected to controller 174, the third electronic switch 184 and the capacitor 186, to receive one bit of the total value and accordingly changes its ON/OFF state. A second current source 192 connected to the fourth electronic switch 190 and according to the ON/OFF state of the electronic switch 190 generates a second current or zero current.

The startup mode operation of the ninth embodiment is described as follows. First, the driver 168 receives the input voltage $V_{IN}$ from the input terminal 156, thus generating the third pulse signal P3 to the first electronic switch 170, which changes its ON/OFF state accordingly to control the input voltage $V_{IN}$ transmitted to the transformer 158, producing the output signal on load 162 through the second electronic switch 178 and the electronic signal extractor 172. Meanwhile, the transformer 158 also provides energy to controller 174. Specifically, when the third pulse signal P3 is a high voltage level signal, the first electronic switch 170 is turned on, thus the transformer 158 stores energy, while the output capacitor 160 supplies energy to produce the output signal and provide energy to the controller 174. When the third pulse signal P3 is a low voltage level signal, the first electronic switch 170 is turned off, thus the transformer 158 releases energy to generate the output signal and provides energy to the controller 174, while energy is stored in the output capacitor 160.

Then, the electronic signal extractor 172 receives the output signal, captures and sends the corresponding first detection voltage DE1 to the controller 174. The controller 174 receives the first detection voltage DE1 using energy supplied by transformer 158 and capacitor 160, and when the first detection voltage DE1 is less than the first reference voltage VR1, controller 174 generates a first pulse signal P1 and the corresponding first clock signal clk1 within the preset period $T_{min}$, and transmits the signal clk1 to the on-time regulator 176. The controller 174 also generates a third digital signal D3 according to the first pulse signal P1, transmits it to the second electronic switch 178 to change the ON/OFF state of the electronic switch 178. For example, when two bits BS1, BS2 binary number of the initial value is 00, the low threshold value is 00, the high threshold value is 11, the controller 174 transmits the two bits BS1, BS2 of the initial value at the same time to the on-time regulator 176.

Inside the on-time regulator 176, each of the two fourth electronic switches 190 receives the bit BS1 or BS2 respectively of the initial value of 0, hence they are in the OFF state. At the starting, the first clock signal clk1 is a positive pulse signal, while it is a low level signal in the remaining time, the first pulse signal P1 also starts to change from negative to positive, thus the third electronic switch 184 is turned on momentary, causing the voltage across capacitor 186 to be zero, and then the comparator 188 compares the voltage across capacitor 186 with the second reference voltage VR2 to produce an initial pulse signal PS at a low level voltage. Next, the first current produced by the first current source 180 charges the capacitor 186, when the voltage across the capacitor 186 reaches the second reference voltage VR2, the initial pulse signal PS changes from negative to positive, causing the first pulse wave signals P1 to change from positive to negative and remaining in negative at least until the end of the preset period $T_{min}$, when the second clock signal clk2 appears. Within this preset period $T_{min}$, controller 174 captures five frequencies F of the first clock signal clk1 chronologically. Using either the low threshold frequency or the high thresholds frequency and the counting condition, controller 174 evaluates each frequency F sequentially, and finds that all five frequencies F are below the low threshold frequency, as such the two bits B1, B2 of the total value are 11. This five frequencies F can be measured from a single cycle or from different cycles of the first clock signal clk1.

The first pulse signal P1 is then transmitted from the secondary side through the coupling element 166 to the driver 168 at the primary side, which stops generating the third pulse signal P3 upon receiving the first pulse signal P1. Finally, the driver 168 amplifies the first pulse signal P1 generating the first digital signal D1, which is transmitted to the first electronic switch 170, thus the ON/OFF state of the switch 170 is changed accordingly to control the input voltage $V_{IN}$ transmitted to the transformer 158, thereby regulating the output signal. Specifically, when the first digital signal D1 is a low voltage level signal, the first electronic switch 170 is turned off, causing transformer 158 to increase the output signal; when the first digital signal D1 is a high voltage level signal, the first electronic switch 170 is turned on, and transformer 158 reduces the output signal.

After that, the electronic signal extractor 172 receives the output signal again and retrieves and transmits the corresponding second detection voltage DE2 to the controller 174. The controller 174 receives the second detection voltage DE2 using the energy supplied by transformer 158 and the output capacitor 160, and when the second detection voltage DE2 is less than the first reference voltage VR1, the controller 174 generates the second pulse signal P2 and the corresponding second clock signal clk2 within the preset period $T_{min}$, and transmit the signal clk2 to the on-time regulator 176. The controller 174 also generates a third digital signal D3 according to the second pulse signal P2, transfers it to the second electronic switch 178 to change the ON/OFF state of the switch 178. At the same time, controller 174 sends the two bits B1, B2 of the total value to the on-time regulator 176.

Inside the on-time regulator 176, since each the two bits B1, B2 of the total value separately received by the two fourth electronic switches 190 is 1, both the fourth electronic switches 190 are turned on. The second clock signal clk2 is a positive pulse signal, while it is a low voltage level signal in the remaining time, hence it goes from negative to positive at the starting, causing the third electronic switch 184 to momentary turn on, so the voltage across capacitor 186 is zero, thus the comparator 188 compares the voltage across capacitor 186 with the second reference voltage VR2 to produce a fourth pulse signal P4 at a low level voltage. Next, the first current generated by the first current source 180 and the second current generated by the second current source 192 charges the capacitor 186. When the voltage across capacitor 186 reaches the second reference voltage VR2 again, the fourth pulse signal P4 changes from negative to positive, causing the second pulse signal P2 to go from positive to negative, and remains negative at least until the end of the preset period $T_{min}$. Compared to when it only receives the first current, capacitor 186 is able to reach the second reference voltage VR2 faster, so the instance for the second pulse signal P2 to change from positive to negative is earlier compared to that when the first pulse signal P1 goes from positive to negative, which means the duration for the second pulse signal at the high voltage level voltage is shorter than that of the first pulse signal P1.

Through the coupling element 166, the second pulse signal P2 is transmitted from the secondary side to the driver 168 at the primary side, which amplifies the second pulse signal P2, generates the second digital signal D2, and transmits the digital signal D2 to the first electronic switch 170, which changes the ON/OFF state of the electronic switch 170 accordingly to control the input voltage $V_{IN}$ transmitted to transformer 158 from the input terminal 156, thereby regulating the output signal. Specifically, when the second digital signal D2 is a low voltage signal, the first electronic switch 170 is turned off, and transformer 158 increases the output signal. When the second digital signal D2 is a high level signal, the first electronic switch 170 is turned on, and transformer 158 reduces the output signal. Since duration of the second pulse signal P2 at the high level is shorter than that of the first pulse signal P1, the duration for the second digital signal D2 at the high voltage level will be shorter than that of the first digital signal D1, resulting in a smaller $t_{on}$, hence preventing the switching frequency f from entering the audible zone and thereby reducing the noise component.

In the above-described embodiment, the controller 174 uses energy supplied by the transformer 158 to start its operation, which requires the driver 168 to receive an input voltage $V_{IN}$ to generate a third pulse signal P3 that switches the first electronic switch 170 and also drives the transformer 158 to provide energy to the secondary side so that the controller 174 can start to operate. However if an external circuit is directly connected and supplies energy to the controller 174, the driver 168 is no longer required to produce the third pulse signal P3 to drive the first electronic switch 170 and the transformer 158. The isolated converter can directly receive the output signal from the electronic signal extractor 172 to begin operation.

Figure 23:
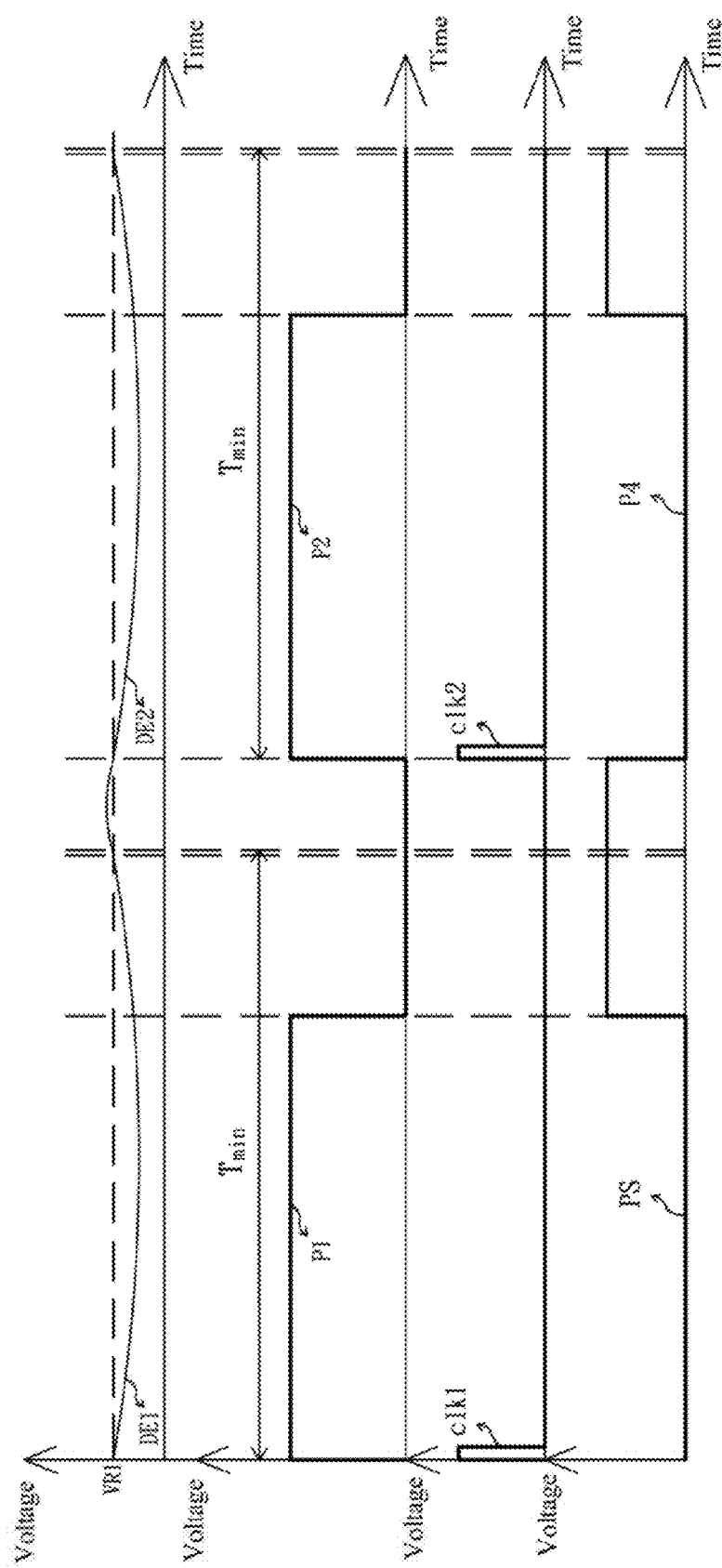
FIG. 23 shows the waveform DE1, P1, clk1, DE2, P2, clk2 and P4 signals of the ninth embodiment of the present invention.
Figure 24:
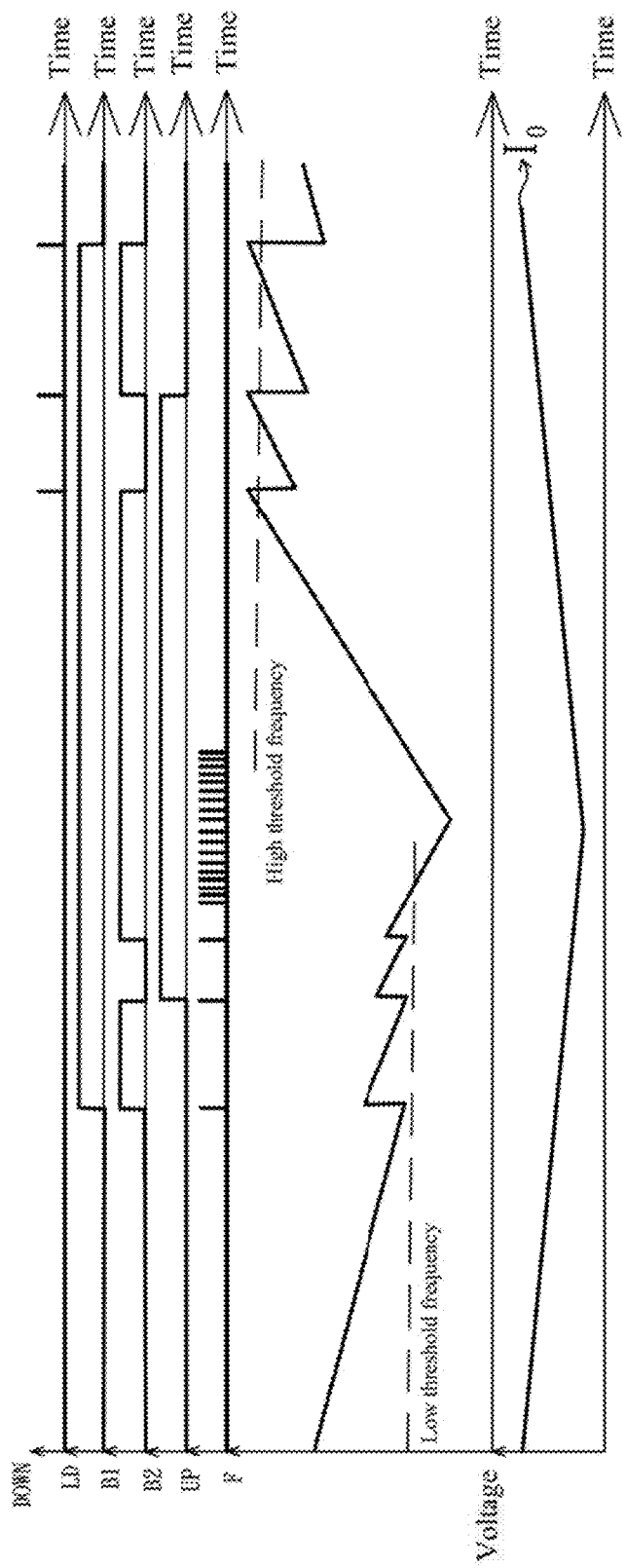
FIG. 24 shows the waveform of DOWN, LD, B1, B2, UP, F and $I_O$ of the ninth embodiment of the present invention.

Referring to FIG. 21, FIG. 23 and FIG. 24, as shown in the analog waveform diagram of FIG. 24, the positive pulse waveform DOWN represents the total value minus 1, the positive pulse waveform UP represents the total value plus 1, the high level waveform of LD represents the load 162 being lightly loaded, high level waveform of B1 or B2 represents a value of 1, low level waveform of B1 or B2 represent a value of 0. As shown in FIG. 21, when the load 162 is a light loaded, $I_O$ decreases. When the frequency F is below the low threshold frequency, positive pulse waveform appears in UP, then the bits B1 and B2 of the total value will change correspondingly between 1 and 0, forming high level waveform, avoiding the audio zone. When the frequency F is higher than the high threshold frequency, positive pulse waveform appears in DOWN, then the bits B1 and B2 of the total value will change correspondingly between 1 and 0, forming a low level waveform.

In summary, the present invention uses the information at the secondary side to determine the duration of the ON/OFF state of the electronic switch in primary side of the transformer, thereby regulating the output signal, while achieving a variety of purposes.

While the above is a complete description of the preferred embodiments of the present invention, it is possible to use various alternatives, modifications and equivalents. Therefore, the scope of the present invention should be determined not with reference to the above description but should, instead, be determined with reference to the appended claims, along with their full scope of equivalents.

The invention claimed is:

1. A constant on-time (COT) isolated converter connected to an input terminal for receiving an input voltage, the constant on-time isolated converter comprises:
   a transformer including a primary side and a secondary side, wherein the primary side is connected to the input terminal and the secondary side is connected to a load with an output signal applied onto the load;
   a processor connected to the secondary side of the transformer and the load being provided with a first preset reference voltage, a low threshold frequency and a high threshold frequency;
   wherein the processor receives the output signal and captures a first detection voltage and a second detection voltage sequentially from the output signal, when the first detection voltage is less than the first reference voltage, the processor generates a first pulse signal and a first clock signal synchronous to and of same frequency as the first pulse signal, thereafter the processor generates a second pulse signal and a second clock signal synchronous to and of same frequency as the second pulse signal, based on at least one frequency of the first clock signal, the low threshold frequency and the high threshold frequency when the second detection voltage is less than the first reference voltage;
   at least one coupling element connected to the processor and to the primary side and the secondary side of the transformer respectively, wherein the coupling element transmits the first pulse signal and the second pulse signal sequentially to the primary side of the transformer;
   a driver connected to the primary side of the transformer and the coupling element, wherein the driver receives and amplifies the first pulse signal and the second pulse signal sequentially, respectively generating a first digital signal and a second digital signal sequentially; and
   a first electronic switch connected to the primary side of the transformer and the driver, wherein the first electronic switch receives the first digital signal and the second digital signal sequentially and accordingly changes its ON/OFF states to control the transformer receiving the input voltage from the input terminal, thus regulating the output signal.

2. The constant on-time isolated converter of claim 1, wherein the driver is further connected to the input terminal for receiving the input voltage to generate a third pulse signal transmitted to the first electronic switch, the first electronic switch changes its ON/OFF states according to the third pulse signal to control the the transformer receiving the input voltage from the input terminal, thus producing the output signal applied onto the load, wherein the process generates the first pulse signal and the second pulse signal under the control of the transformer and the driver stops generating the third pulse signal upon receiving the first pulse signal.

3. The constant on-time isolated converter of claim 2, wherein when the third pulse signal is a high voltage level signal, the first electronic switch is turned on, and the transformer stores energy; when the third pulse signal is a low voltage level signal, the first electronic switch is turned off, the transformer releases energy producing the output signal applied onto the load, wherein the processor generates the first pulse signal and the second pulse signal based on the output signal.

4. The constant on-time isolated converter of claim 1, wherein a duration for the ON/OFF state of the first electronic switch is determined by an instance the first pulse signal changes from negative to positive, an instance the first pulse signal changes from positive to negative, an instance the second pulse signal changes from negative to positive and an instance the second pulse signal changes from positive to negative.

5. The constant on-time isolated converter of claim 1, wherein when the at least one frequency of the first clock signal is lower than the low threshold frequency, an on-time duration the first electronic switch controlled by the first digital signal is longer than an on-time duration the first electronic switch controlled by the second digital signal; when the at least one frequency of the first clock signal is higher than the high threshold frequency, the on-time duration the first electronic switch controlled by the first digital signal is shorter than the on-time duration the first electronic switch controlled by the second digital signal.

6. The constant on-time isolated converter of claim 5, wherein the processor is provided with a low threshold value, a high threshold value, an initial value corresponding to the first pulse signal and a counting condition; wherein the counting condition being when the at least one frequency of the first clock signal is lower than the low threshold frequency, the initial value increases by 1, when the at least one frequency of the first clock signal is higher than the high threshold frequency, the initial value decreases by 1; in the event the at least one frequency of the first clock signal comprises a plurality of frequencies, the processor evaluates each frequency of the at least one frequency of the first clock signal with either the low threshold frequency or the high threshold frequency according to the counting condition, to obtain a total value; any said total value greater than the high threshold value is replaced by the high threshold value, and any said total value less than the low threshold value is replaced by the low threshold value; wherein the initial value, the low threshold value, the high threshold value and total value are all greater than or equal to zero; wherein the processor generates the second pulse signal based on the total value.

7. The constant on-time isolated converter of claim 6, wherein when the total value is greater than the initial value, the on-time duration the first electronic switch controlled by the first digital signal is longer than the on-time duration the first electronic switch controlled by the second digital signal; when the total value is less than the initial value, the on-time duration the first electronic switch controlled by the first digital signal is shorter than the on-time duration the first electronic switch controlled by the second digital signal; when the total value equals to the initial value, the on-time duration the first electronic switch controlled by the first digital signals equals the on-time duration the first electronic switch controlled by the second digital signal.

8. The constant on-time isolated converter of claim 7, wherein when a difference between the total value and the initial value increases, a difference between the on-time duration the first electronic switch controlled by the first digital signal and the on-time duration the first electronic switch controlled by the second digital signal.

9. The constant on-time isolated converter of claim 8, wherein the initial value, the low threshold value, the high threshold value and the total value are all represented by at least one binary bit.

10. The constant on-time isolated converter of claim 9, wherein the processor comprises:

an electronic signal extractor connected to the secondary side of the transformer and the load, wherein the electronic signal extractor receives the output signal and captures the first detection voltage and the second detection voltage sequentially;
a controller connected to the coupling element, the secondary side of the transformer and the electronic signal extractor; wherein the controller is provided with the first preset reference voltage, the counting condition, the low threshold frequency, the high threshold frequency, the initial value, the low threshold value and the high threshold value, and receives the first detection voltage and the second detection voltage sequentially; wherein when the first detection voltage is less than the first preset reference voltage, the controller generates the first pulse signal and the first clock signal;
the controller further evaluates each frequency of the at least one frequency of the first clock signal sequentially according to the counting condition to obtain the total value utilizing the low threshold frequency or the high threshold frequency, thereafter when the second detection voltage is less than the first preset reference voltage, the controller generates the second pulse signal and the second clock signal based on the total value; wherein the second clock signal is a positive pulse signal when the second pulse signal changes from negative to positive, and the second clock signal is a low level signal at all the other times; and
an on-time regulator connected to the controller for receiving the total value and the second clock signal to generate a fourth pulse signal accordingly, wherein the fourth pulse signal controls the second pulse signals changing from positive to negative when the fourth pulse signal changes from negative to positive.

11. The constant on-time isolated converter of claim 10, further comprising a second electronic switch connected between the secondary side of the transformer and the load, and further connected to the controller; wherein when the controller generates the first pulse signal or the second pulse signal, the controller further accordingly generates a third digital signal transmitted to the second electronic switch to change ON/OFF states of the second electronic switch such that the first electronic switch and the second electronic switch are in opposite ON/OFF states or are both OFF.

12. The constant on-time isolated converter of claim 11, wherein the second electronic switch is an N-channel metal oxide semiconductor field effect transistor.

13. The constant on-time isolated converter of claim 10, wherein the on-time regulator comprises:
a first current source generating a first current;
at least one current generator connected to the controller receiving the bit of the total value to generate at least one second current or zero current;
a third electronic switch connected to the controller, the first current source and the at least one current generator to receive the second clock signal, wherein the third electronic switch is turned on momentarily when the positive pulse appears and is turned off at other times;
a capacitor connected in parallel with the third electronic switch, and further connected to the first current source and the current generator; wherein the capacitor stores a dependent voltage based on the first current received, and the second current or the zero current received, according to ON/OFF states of the third electronic switch; and a comparator connected to the capacitor and the controller receiving a second preset reference voltage and the dependent voltage to produce the fourth pulse signal.

14. The constant on-time isolated converter of claim 13, wherein the initial value, the low threshold value, the high threshold value and the total value are all represented by plural binary bits; f wherein the at least one current generator comprises a plurality of current generators and the at least one second current comprises a plurality of second currents respectively generated by the plurality of current generators according to the plural binary bits of the total value received respectively; a corresponding current generator receiving a bit of 0 generates a zero current, and a corresponding current generator receiving a bit of 1 generates a second current having a magnitude corresponding to a binary power of the bit in the plural binary bits of the total value.

15. The constant on-time isolated converter of claim 13, wherein the current generator comprises:
a fourth electronic switch connected to the controller, the third electronic switch and the capacitor, wherein the fourth electronic switch receives the at least one binary bit of the total value to change ON/OFF states accordingly; and
a second current source, connected to the fourth electronic switch, wherein the second current source generates the second current or the zero current according to the ON/OFF states of the fourth electronic switch.

16. The constant on-time isolated converter of claim 1, wherein the second pulse signal is of at least one cycle, each cycle of the second pulse signal provides a high level voltage in a first half cycle and a low level voltage in a second half cycle.

17. The constant on-time isolated converter of claim 1, wherein the first electronic switch is an N-channel metal oxide semiconductor field effect transistor or a bipolar junction transistor.

18. The constant on-time isolated converter of claim 1, wherein the coupling element is a capacitor, a transformer, a piezoelectric element or an optical coupling element.

19. The constant on-time isolated converter of claim 1, wherein when the first digital signal or the second digital signal is a high voltage level signal, the first electronic switch is turned on to control the transformer decreasing the output signal; when the first digital signal or the second digital signal is a low voltage level signal, the first electronic switch is accordingly turned off to control the transformer increasing the output signal.

* * * * *